US012566693B2

(12) United States Patent
Park et al.

(10) Patent No.: US 12,566,693 B2
(45) Date of Patent: Mar. 3, 2026

(54) MEMORY DEVICE STORING MAPPING INFORMATION, MEMORY SYSTEM INCLUDING THE SAME, AND OPERATING METHOD OF MEMORY SYSTEM

(71) Applicant: SAMSUNG ELECTRONICS CO., LTD., Suwon-si (KR)

(72) Inventors: Jungho Park, Suwon-si (KR); Insu Kim, Suwon-si (KR); Beomkyu Shin, Suwon-si (KR); Jaeyong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/426,975

(22) Filed: Jan. 30, 2024

(65) Prior Publication Data

US 2024/0264934 A1      Aug. 8, 2024

(30) Foreign Application Priority Data

Feb. 3, 2023      (KR) ........................ 10-2023-0014902

(51) Int. Cl.
*G06F 12/02* (2006.01)
*G06F 12/0882* (2016.01)
*G06F 13/16* (2006.01)

(52) U.S. Cl.
CPC ...... *G06F 12/0246* (2013.01); *G06F 12/0882* (2013.01); *G06F 13/1668* (2013.01); *G06F 2212/7201* (2013.01)

(58) Field of Classification Search
None
See application file for complete search history.

(56) References Cited

U.S. PATENT DOCUMENTS 6,282,624 B1      8/2001   Kimura et al.
7,774,658 B2 *   8/2010   Safford ............... G06F 11/1064
                                                                      714/53

(Continued)

FOREIGN PATENT DOCUMENTS

KR          10-1547418  B1      8/2015

OTHER PUBLICATIONS

Communication issued May 31, 2024 by the European patent Office in European patent Application No. 24154142.4.

*Primary Examiner* — Kevin Verbrugge
(74) *Attorney, Agent, or Firm* — Sughrue Mion, PLLC

(57)          ABSTRACT

In some embodiments, the memory system for communicating with a host includes a non-volatile memory device storing first mapping information, a volatile memory device storing second mapping information, and a memory controller. The first mapping information indicates a relationship between a logical address and a portion of a first physical address. The first physical address indicates a location where user data is stored. The second mapping information indicates a second relationship between the logical address and a second physical address that corresponds to a remaining portion of the first physical address. The memory controller is configured to obtain a target logical address that has been received from the host, and determine, based on the second mapping information, a target second physical address mapped to the target logical address. The non-volatile memory device is configured to obtain a target first physical address by using the first mapping information.

20 Claims, 15 Drawing Sheets

<u>10</u>

(56)  References Cited

U.S. PATENT DOCUMENTS

| | | | |
|---|---|---|---|
| 8,452,929 B2 | 5/2013 | Bennett | |
| 8,886,911 B2 | 11/2014 | Nemazie et al. | |
| 8,898,414 B2 | 11/2014 | Park et al. | |
| 10,310,769 B2 | 6/2019 | Lee | |
| 10,747,680 B2 | 8/2020 | Yang et al. | |
| 10,915,475 B2 | 2/2021 | Dubey et al. | |
| 11,301,369 B2 | 4/2022 | Gholamipour et al. | |
| 2002/0174397 A1* | 11/2002 | Furukawa | G06F 11/1072 |
| | | | 714/764 |
| 2003/0061560 A1* | 3/2003 | Furukawa | G11C 11/56 |
| | | | 714/764 |
| 2006/0282644 A1 | 12/2006 | Wong | |
| 2007/0300037 A1 | 12/2007 | Rogers et al. | |
| 2015/0006591 A1 | 1/2015 | Lee et al. | |
| 2016/0019160 A1 | 1/2016 | Mohan et al. | |
| 2016/0364289 A1* | 12/2016 | Beattie | G06F 3/064 |
| 2017/0300246 A1* | 10/2017 | Michaeli | G06F 3/0688 |
| 2020/0004456 A1 | 1/2020 | Williams et al. | |
| 2020/0241958 A1* | 7/2020 | Shin | G06F 12/0238 |
| 2023/0333976 A1* | 10/2023 | Ballapuram | G06F 11/1048 |
| 2024/0345727 A1* | 10/2024 | He | G06F 3/0659 |

* cited by examiner

| MIF1 | |
|------|------|
| LPN1 | mu1 |
| LPN2 | mu2 |
| LPN3 | mu3 |
| LPN4 | mu4 |
| LPN5 | mu5 |

320

| MIF2 | |
|------|--------|
| LPN1 | PPN2_1 |
| LPN2 | PPN2_2 |
| LPN3 | PPN2_3 |
| LPN4 | PPN2_4 |
| LPN5 | PPN2_5 |

330

| | | |
|--------|--------|-----|
| PPN1_1 | PPN2_1 | mu1 |
| PPN1_2 | PPN2_2 | mu2 |
| PPN1_3 | PPN2_3 | mu3 |
| PPN1_4 | PPN2_4 | mu4 |

Figure 9:
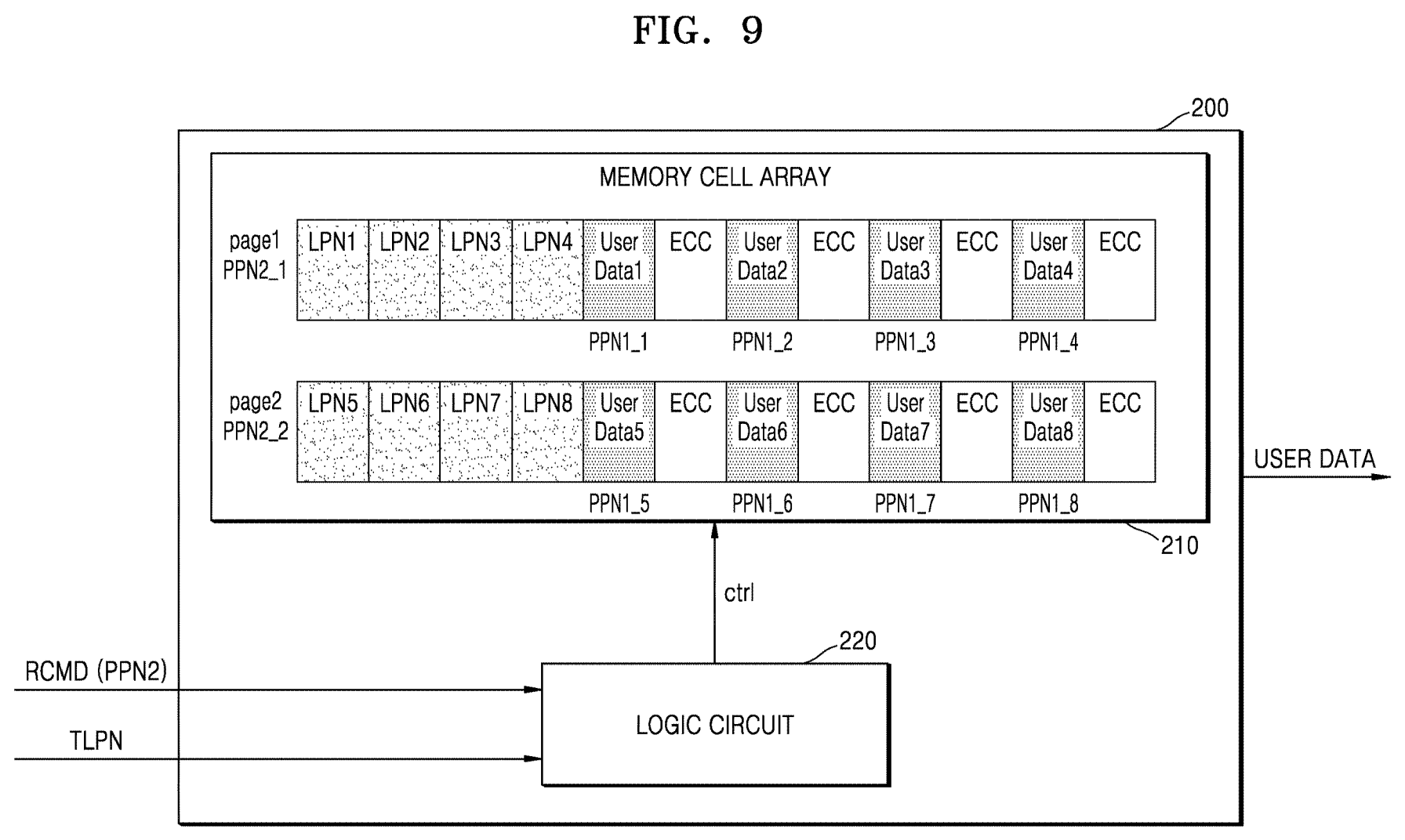

MEMORY CELL ARRAY

200

210

220

LOGIC CIRCUIT ctrl

RCMD (PPN2)

TLPN

USER DATA page1
PPN2_1

| LPN1 | LPN2 | LPN3 | LPN4 |
|------|------|------|------|

| User Data1 | ECC | User Data2 | ECC | User Data3 | ECC | User Data4 | ECC |
|------------|-----|------------|-----|------------|-----|------------|-----|

PPN1_1    PPN1_2    PPN1_3    PPN1_4 page2
PPN2_2

| LPN5 | LPN6 | LPN7 | LPN8 |
|------|------|------|------|

| User Data5 | ECC | User Data6 | ECC | User Data7 | ECC | User Data8 | ECC |
|------------|-----|------------|-----|------------|-----|------------|-----|

PPN1_5    PPN1_6    PPN1_7    PPN1_8

FIG. 10 page

| LPN | LPN | LPN | LPN | BCH | User Data | ECC | User Data | ECC | User Data | ECC | User Data | ECC |

MEMORY DEVICE STORING MAPPING INFORMATION, MEMORY SYSTEM INCLUDING THE SAME, AND OPERATING METHOD OF MEMORY SYSTEM

CROSS-REFERENCE TO RELATED APPLICATIONS

This application claims benefit of priority under 35 U.S.C. § 119 to Korean Patent Application No. 10-2023-0014902, filed on Feb. 3, 2023, in the Korean Intellectual Property Office, the disclosure of which is incorporated by reference herein in its entirety.

BACKGROUND

1. Field

The present disclosure relates to a memory system, and more particularly, to a memory device storing mapping information, a memory system including the memory device, and an operating method of the memory system.

2. Description of Related Art

As non-volatile memory, flash memory may retain data stored therein even when power thereto is cut off. Memory systems (or storage devices), such as solid-state drives (SSDs) and memory cards, which include flash memory are widely used and are useful for storing or moving a large amount of data.

Memory systems store mapping information between a logical address from a host and a physical address indicating a physical storage location of data. Volatile memory and non-volatile memory of memory systems may store the mapping information. For example, volatile memory, such as static random access memory (SRAM) and dynamic RAM (DRAM), may store the mapping information. However, with the increase in the capacity of memory systems, the amount of addresses and the amount of mapping information have increased. To store a large amount of mapping information in non-volatile memory, manufacturing cost may increase.

Therefore, approaches for decreasing the amount of mapping information stored in volatile memory and mapping a logical address to a physical address by using mapping information stored in non-volatile memory are desired.

SUMMARY

Aspects of the present disclosure provide for a memory device obtaining a physical address by using mapping information, a memory system including the memory device, and an operating method of the memory system.

According to an aspect of the present disclosure, a memory system for communicating with a host is provided. The memory system includes a non-volatile memory device storing first mapping information, a volatile memory device storing second mapping information, and a memory controller. The first mapping information indicates a first relationship between a logical address and a portion of a first physical address. The first physical address indicates a location where user data is stored in a memory cell array. The second mapping information indicates a second relationship between the logical address and a second physical address. The second physical address corresponds to a remaining portion of the first physical address. The memory controller is configured to obtain a target logical address that has been received from the host, and determine, based on the second mapping information, a target second physical address mapped to the target logical address. The non-volatile memory device is configured to obtain a target first physical address by using the first mapping information, based on a read command including information on the target second physical address.

According to an aspect of the present disclosure, a memory device is provided. The memory device includes a memory cell array and a logic circuit. The memory cell array includes a plurality of pages storing first mapping information. The first mapping information indicates a first relationship between a logical address and a portion of a first physical address. The portion of the first physical address corresponds to each of a plurality of cells. The logic circuit is configured to receive a read command including information on a second physical address corresponding to a remaining portion of the first physical address, and obtain a target first physical address by using the first mapping information in response to the read command including information on a target second physical address mapped to a target logical address that is a target of a memory operation.

According to an aspect of the present disclosure, an operating method of a memory system is provided. The operating method includes receiving, by a memory controller of the memory system, a target logical address from a host, the target logical address being a target of a memory operation. The operating method further includes mapping, by the memory controller, the target logical address to a target second physical address, based on second mapping information indicating a second relationship between a logical address and a second physical address corresponding to a remaining portion of a first physical address, the second mapping information being stored in a volatile memory of the memory controller. The operating method further includes transmitting, by the memory controller, a read command to a non-volatile memory device of the memory system. The read command includes information on the target second physical address. The operating method further includes obtaining, by the non-volatile memory device, a target first physical address by using first mapping information indicating a first relationship between the logical address and a portion of the first physical address, based on the read command. The portion of the first physical address corresponds to each of a plurality of cells included in each of a plurality of pages.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 2 is a diagram illustrating a memory cell array, according to an embodiment;

FIG. 3 is a diagram illustrating mapping information, according to an embodiment;

FIG. 8 is a diagram illustrating the operation of a logic circuit, according to an embodiment;

FIG. 9 is a diagram illustrating a page, according to an embodiment;

FIG. 10 is a diagram illustrating the structure of a page, according to an embodiment;

Figure 12:
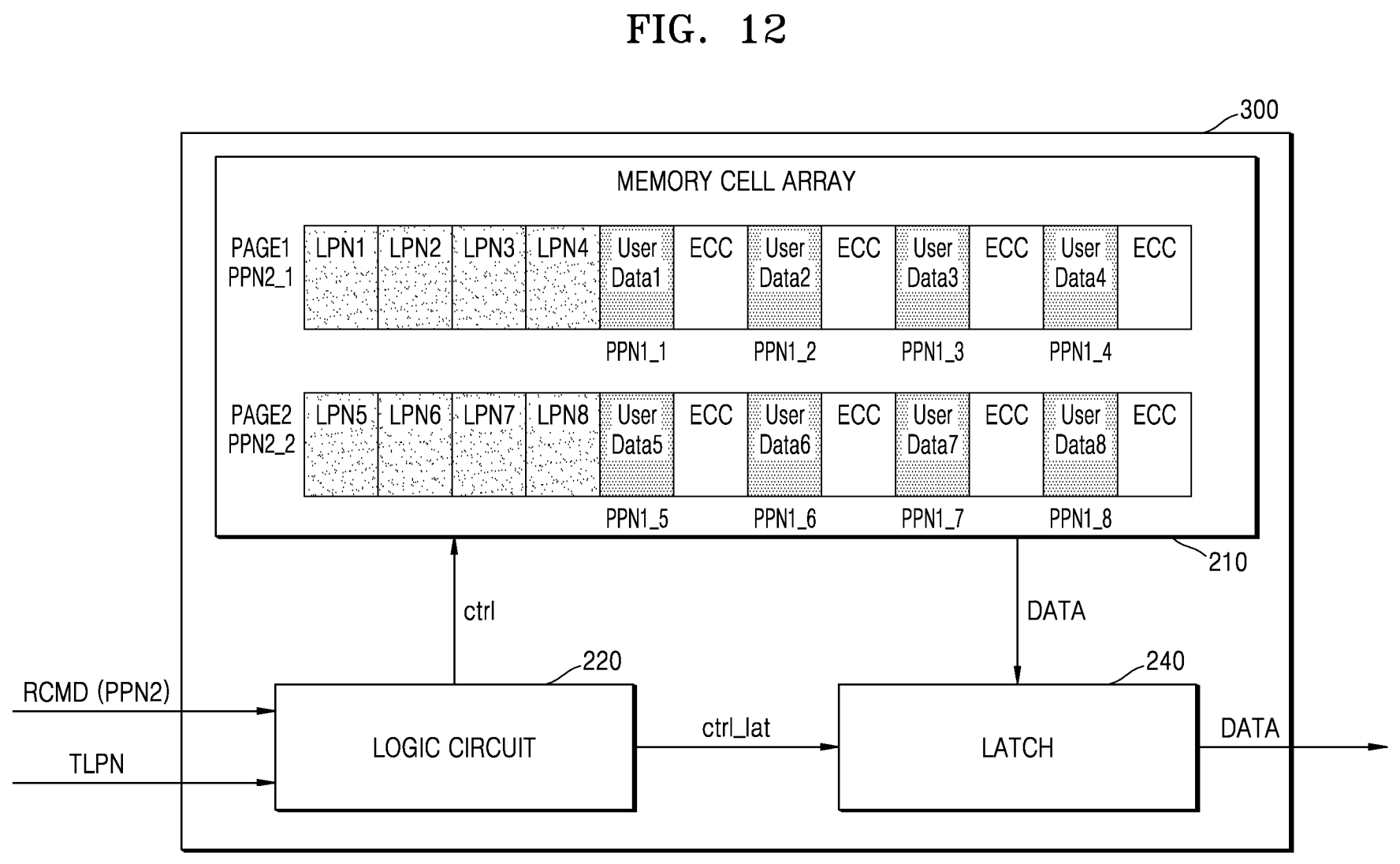

FIG. 12 is a diagram illustrating a memory device, according to an embodiment;

FIG. 13 is a block diagram of a host-memory system, according to an embodiment;

DETAILED DESCRIPTION

Figure 1:
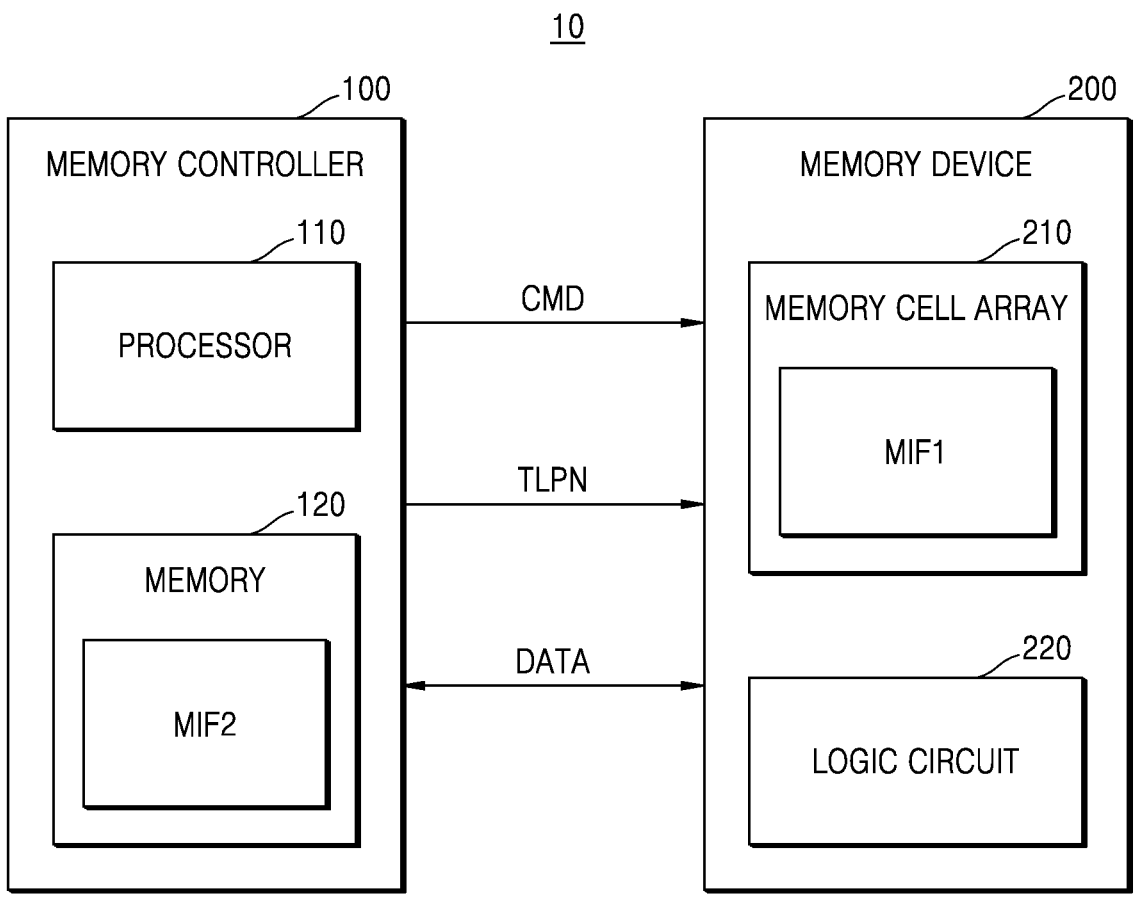
FIG. 1 is a block diagram of a memory system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below,"

"directly under," "directly beneath," "directly connected to" or "directly coupled to" another element or layer, there are no intervening elements or layers present.

The terms "upper," "middle", "lower", and the like may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", and the like may be used to distinguish components from each other and do not limit the present disclosure. For example, the terms "first", "second", "third", and the like may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, various embodiments of the present disclosure are described with reference to the accompanying drawings.

FIG. 1 is a block diagram of a memory system, according to an embodiment.

Referring to FIG. 1, a memory system 10 may include a memory controller 100 and a memory device 200. The memory device 200 may include a memory cell array 210 and a logic circuit 220.

The memory system 10 may communicate with a host (e.g., host 1100 of FIG. 13) through various interfaces, such as, but not limited to, a universal serial bus (USB) interface, a multimedia card (MMC) interface, an embedded MMC (eMMC) interface, a peripheral component interconnection (PCI) interface, a PCI express (PCIe) interface, an advanced technology attachment (ATA) interface, a serial ATA (SATA) interface, a parallel ATA (PATA) interface, a small computer system interface (SCSI), an enhanced small disk interface (ESDI), an integrated drive electronics (IDE) interface, a FireWire interface, a universal flash storage (UFS) interface, and a non-volatile memory express (NVMe) interface.

According to an embodiment, the memory device 200 may be and/or may include a non-volatile memory device, such as, but not limited to, flash memory. For example, in such an embodiment, the memory device 200 may be implemented as a non-volatile memory device. In some embodiments, the memory system 10 may be implemented by using memory that may be embedded in or removed from an electronic device. For example, the memory system 10 may be implemented in various forms, such as, but not limited to, an embedded UFS memory device, an eMMC, an SSD, a UFS memory card, a compact flash (CF), a secure digital (SD), a micro-SD, a mini-SD, an extreme digital (xD), and a memory stick. The memory system 10 may store data in a non-volatile manner. In an embodiment, the memory system 10 may be referred to as a storage device.

The memory device 200 may include the memory cell array 210 and the logic circuit 220. The memory cell array 210 may include a plurality of blocks. Each of the memory blocks may include a plurality of pages. Each of the pages may include a plurality of memory cells sharing one word line with each other. For example, a block may be an erase unit and a page may be a write/read unit.

In an embodiment, the memory device 200 may correspond to a non-volatile memory device. For example, the non-volatile memory device may be and/or may include a NAND flash memory device. However, the present disclosure is not limited thereto, and the memory device 200 may be and/or may include other types and/or combinations of types of memory. For example, the memory device 200 may be and/or may include a resistive-type memory device (e.g., resistive RAM (ReRAM) device), a phase-change RAM (PRAM) device, or a magnetic RAM (MRAM) device. Hereinafter, for ease of description, it may be assumed that the memory device 200 is a NAND flash memory device.

The memory cell array 210 may include a three-dimensional (3D) memory cell array, which may include a plurality of NAND strings. Each NAND string may include memory cells respectively connected to word lines vertically stacked on a substrate. However, the present disclosure is not limited thereto, and the memory cell array 210 may be configured in various manners without departing from the scope of the present disclosure. For example, the memory cell array 210 may include a two-dimensional (2D) memory cell array, which may include a plurality of NAND strings arranged in row and column directions.

In an embodiment, the memory device 200 may store first mapping information MIF1. The first mapping information MIF1 may refer to mapping information between a part of a first physical address and a logical address. The first physical address may refer to an entire physical address mapped to the logical address. A part of the first physical address may refer to lower N bits of the first physical address, where N is a positive integer greater than zero (0). The first physical address may indicate a physical location where user data is stored in the memory cell array 210. In an embodiment, the logical address may be generated by a host to control a memory operation.

The memory cell array 210 may include a meta area and/or a user area. The meta area may include metadata. The metadata may refer to data that manages user data and/or data generated by the memory system 10 to manage the memory device 200. Alternatively or additionally, the user area may include user data. In an embodiment, the memory controller 100 may back up various pieces of information to the meta area of the memory device 200 to prepare for a power-off situation.

As shown in FIG. 1, the first mapping information MIF1 may be stored in the memory cell array 210. In an embodiment, the first mapping information MIF1 may be stored in a meta area. For example, metadata may include the first mapping information MIF1. The first mapping information MIF1 may be stored in each of a plurality of pages. Alternatively or additionally, the first mapping information MIF1 may include information about a logical address and a part of a first physical address with respect to a page in which the first mapping information MIF1 is stored. For example, the first physical address may indicate a cell in which user data is stored.

The logic circuit 220 may generally control operations of the memory device 200. In an embodiment, the logic circuit 220 may perform various internal control operations in relation to memory operations. For example, the logic circuit 220 may perform internal control operations to program data to or read data from the memory cell array 210, based on a command CMD from the memory controller 100.

The memory controller 100 may control a write, read, and/or erase operation of the memory device 200 by providing the command CMD to the memory device 200. Data to be stored in the memory device 200 and/or data read from the memory device 200 may be exchanged between the memory controller 100 and the memory device 200. The memory controller 100 may include a processor 110. The processor 110 may generally control the internal operations of the memory controller 100. Alternatively or additionally, the processor 110 may control the memory operations of the memory device 200.

In response to various requests, such as a write request and a read request, from a host, the memory controller 100 may control the memory device 200 to read data stored therein and/or write (or program) data thereto.

The memory controller 100 may include a memory 120. Second mapping information MIF2 may be stored in the memory 120. In an embodiment, the memory 120 may be and/or may include volatile memory. For example, the memory 120 may include, but not be limited to, dynamic random access memory (DRAM), static random access memory (SRAM), and the like. However, the present disclosure is not limited thereto, and the memory 120 may be implemented using other types of memory without departing from the scope of the present disclosure. For another example, although the memory 120 is illustrated in FIG. 1 as being included in the memory controller 100, in an optional or additional embodiment, the memory 120 may be disposed outside of the memory controller 100.

The memory 120 may store the second mapping information MIF2. The second mapping information MIF2 may refer to mapping information between a second physical address and the logical address. The second physical address may refer to the remaining part of the first physical address. For example, the second physical address may be obtained by removing the lower N bits from the bits of the first physical address. The second physical address may be the remaining part of the first physical address, and thus, may approximately indicate a location where user data is stored in the memory cell array 210. In an embodiment, the second physical address may be in a larger range than the first physical address. In an embodiment, the size (e.g., number of bits) of the second physical address may be less (e.g., smaller) than the size of the first physical address. Consequently, the second mapping information MIF2 which corresponds to the mapping information between the logical address and the second physical address, having a smaller size than the mapping information between the logical address and the first physical address, may be stored in the memory 120. In an embodiment, the logical address may be transmitted from a host to the memory controller 100. In an optional or additional embodiment, the memory controller 100 may transmit the logical address to the memory device 200.

A logical address provided from a host may be referred to as a logical page address (LPA) and/or a logical page number (LPN). Alternatively or additionally, a physical address may be referred to as a physical page address (PPA) and/or a physical page number (PPN). For convenience of description, the terms "logical address LPN" and "physical address PPN" may be used for mapping information below.

In an embodiment, the processor 110 of the memory controller 100 may map a logical address to a second physical address based on the second mapping information MIF2. For example, the processor 110 may receive a target logical address of a memory operation from a host and obtain a target second physical address mapped to the target logical address based on the second mapping information MIF2. Based on the target second physical address, the processor 110 may provide the command CMD for controlling a memory operation of the memory device 200.

In an embodiment, the processor 110 may provide the command CMD to the memory device 200. For example, the processor 110 may provide a read command to the memory device 200. The read command may control the memory device 200 to read data from a physical address corresponding to the target logical address. In an embodiment, the read command may include information on the target second physical address. The memory controller 100 may provide the read command to the memory device 200 and receive data corresponding to the read command from the memory device 200. Alternatively or additionally, the memory controller 100 may provide a write command and data to the memory device 200 so that the data may be stored in the memory device 200.

In an embodiment, the memory device 200 may receive the command CMD. For example, the memory device 200 may receive the read command from the memory controller 100. In response to the read command, the memory device 200 may obtain a target first physical address by using the first mapping information MIF1. That is, the logic circuit 220 may receive the read command, and may search for a location where data corresponding to a second physical address is stored, based on the read command. Because the second physical address is a part of a first physical address, it may be difficult to accurately determine a physical location at which user data corresponding to the target logical address is stored by using only the read command that may only include information on the target second physical address. As such, in order to complete the first physical address, the logic circuit 220 may obtain the target first physical address mapped to the target first logical address by using the first mapping information MIF1 including information on the part of the first physical address that may exclude the second physical address. For example, the logic circuit 220 may read user data from a physical location corresponding to the target first physical address in the memory cell array 210.

In an embodiment, the memory controller 100 may transmit a target logical address TLPN to the memory device 200. The memory device 200 may receive the target logical address TLPN. In an embodiment, the memory device 200 may obtain a target first physical address mapped to the target logical address TLPN, based on the target logical address TLPN. For example, the logic circuit 220 may receive the target logical address TLPN and obtain the target first physical address based on the target logical address TLPN and the first mapping information MIF1. The operation of the logic circuit 220 is described with reference to FIGS. 8 and 9.

Because a second physical address is stored in the memory 120, the amount of data stored in the memory 120 may decrease compared when a first physical address is stored in the memory 120. Thereby, the manufacturing cost of a memory system 10 may be reduced by decreasing the amount of mapping information stored in the memory 120. For example, the first physical address may be obtained by using the first mapping information MIF1 stored in the memory device 200.

Figure 2:
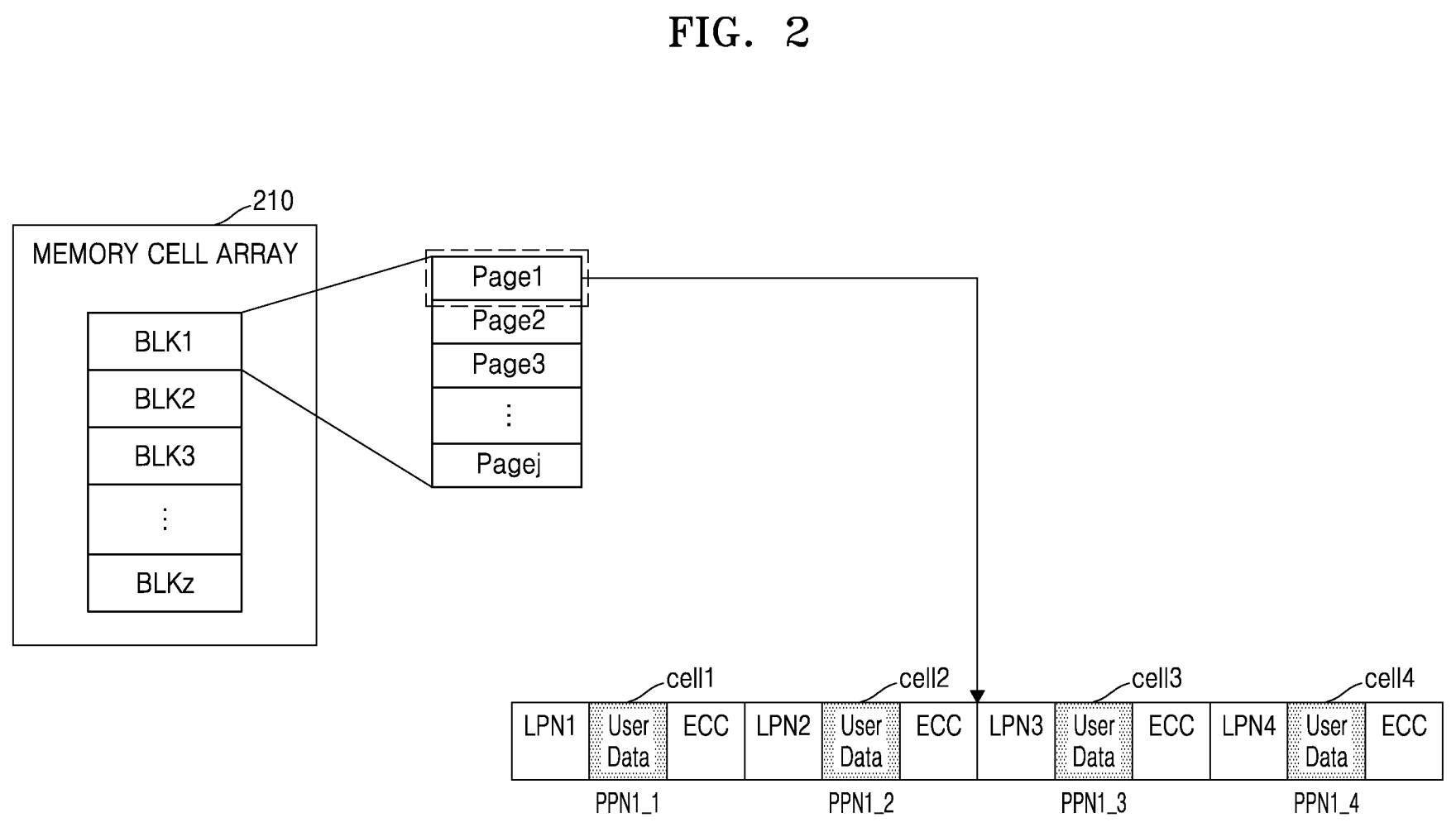

FIG. 2 is a diagram illustrating a memory cell array, according to an embodiment. The memory cell array 210 in FIG. 2 may include or may be similar in many respects to the memory cell array 210 in FIG. 1, and may include additional features not mentioned above. Thus, redundant descriptions thereof may be omitted.

Referring to FIG. 2, the memory cell array 210 may include a plurality of memory blocks (e.g., first memory block BLK1, second memory block BLK2, third memory block BLK3, to z-th memory block BLKz, where z is a positive integer greater than zero (0), and hereinafter generally referred to as "BLK"). Each block BLK of the plurality of memory blocks may include a plurality of pages. For example, the first memory block BLK1 may include a plurality of pages (e.g., first page Page1, second page Page2, third page Page3, to j-th page Pagej, where j is a positive integer greater than zero (0), and hereinafter generally referred to as Page). Each page Page of the plurality of pages Page1 to Pagej may include a plurality of cells. Each cell may store user data. For example, each page Page of the plurality of pages Page1 to Pagej may include a plurality of cells (e.g., first cell cell1, second cell cell2, third cell cell3, and fourth cell cell4). Each cell of the plurality of cells cell1 to cell4 may store user data. However, the number of cells included in a single page is not limited to four, and various numbers of cells may be included in a single page.

A plurality of first physical addresses (e.g., first first physical address PPN1_1, second first physical address PPN1_2, third first physical address PPN1_3, and fourth first physical address PPN1_4) may respectively correspond to the plurality of cells cell1 to cell4. Each first physical address of the plurality of first physical addresses PPN1_1 to PPN1_4 may indicate a physical location of a cell from among the plurality of cells cell1 to cell4 corresponding thereto. For example, the first first physical address PPN1_1 may correspond to the first cell cell1, the second first physical address PPN1_2 may correspond to the second cell cell2, the third first physical address PPN1_3 may correspond to the third cell cell3, and the fourth first physical address PPN1_4 may correspond to the fourth cell cell4.

Each page Page of the plurality of pages Page1 to Pagej may store first mapping information and user data. That is, each page Page of the plurality of pages Page1 to Pagej may store first mapping information corresponding to user data stored therein. For example, the first page Page1 may store first mapping information corresponding to user data stored in the first page Page1, the second page Page2 may store first mapping information corresponding to user data stored in the second page Page2, the third page Page3 may store first mapping information corresponding to user data stored in the third page Page3, and the j-th page Pagej may store first mapping information corresponding to user data stored in the j-th page Pagej. The first mapping information stored in each page may include a plurality of logical addresses (e.g., first address LPN1, second logical address LPN2, third logical address LPN3, and fourth logical address LPN4). For example, the first page Page1 may store first mapping information including the first logical address LPN1, the second logical address LPN2, the third logical address LPN3, and the fourth logical address LPN4.

Each of the plurality of logical addresses LPN1 to LPN4 may be mapped to a part of a first physical address corresponding to one of a plurality of cells of a page. Each of the plurality of first physical addresses PPN1_1 to PPN1_4 respectively corresponding to the cells may be obtained by using a second physical address and a part of each first physical address. For example, a memory device (e.g., the memory device 200 in FIG. 1) may read user data from the first cell cell1 corresponding to the first physical address PPN1_1 in response to a read command. For another example, user data stored in the second cell cell2 corresponding to the first physical address PPN1_2 may be read.

Each page Page of the plurality of pages Page1 to Pagej may store first mapping information, user data, and/or an error checking and correction code (ECC). The ECC may refer to a code for detecting and correcting at least one error in the user data. In an embodiment, the logical address LPN, the user data, and the ECC may be sequentially arranged in each page Page of the plurality of pages Page1 to Pagej. However, the present disclosure is not limited thereto, and the data stored in the plurality of pages may be arranged in a different manner. For example, the logical addresses may be consecutively arranged in a page Page.

FIG. 3 is a diagram illustrating mapping information, according to an embodiment.

Referring to FIG. 3, the mapping information may be in the form of a mapping table. The first mapping information MIF1 310 may be stored in a memory device (e.g., the memory device 200 in FIG. 1). The first mapping information MIF1 310 may refer to mapping information between a logical address and a part of a first physical address. A target first physical address mapped to a target logical address may indicate a location where user data corresponding to the target logical address is stored. The first physical address may indicate a cell in which the user data is stored. A part of the target first physical address mapped to the target logical address may include lower N bits in the first physical address. The lower "N bits may include information (hereinafter, referred to as cell information) about the cell in which the user data is stored.

The second mapping information MIF2 320 may be stored in a memory (e.g., the memory 120 in FIG. 1). For example, the second mapping information MIF2 320 may be stored in a memory controller (e.g., the memory controller 100 in FIG. 1). The second mapping information MIF2 320 may refer to mapping information between the logical address and a second physical address. The second physical address may include a remaining part of the first physical address when the part of the first physical address is excluded. A target second physical address mapped to the target logical address may approximately indicate a location where the user data corresponding to the target logical address is stored. In an embodiment, the second physical address may indicate a page in which the user data is stored. For example, as shown in FIG. 3, when the target logical address is the first logical address LPN1, the target second physical address may be a second physical address PPN2_1.

The second physical address PPN2_1 may indicate a page in which user data corresponding to the first logical address LPN1 is stored.

The second physical address may include another part of the first physical address. The second physical address may indicate the location of a page in the memory device 200. Cell information may indicate the location of a cell in the memory device 200. When the second physical address is combined with the cell information, the first physical address may be completed, and the location of a cell in the memory device 200 may be accurately derived. As described herein, it may be assumed that the plurality of first physical addresses PPN1_1 to PPN1_4 may respectively indicate a plurality of cells included in a first page. For example, according to first mapping information MIF1 310, the first logical address LPN1 may be mapped to the first cell information mu1, the second logical address LPN2 may be mapped to the second cell information mu2, the third logical address LPN3 may be mapped to the third cell information mu3, and the fourth logical address LPN4 may be mapped to the fourth cell information mu4. Alternatively or additionally, according to the second mapping information MIF2 320, the first address LPN1 may be mapped to the second physical address PPN2_1, the second logical address LPN2 may be mapped to the second physical address PPN2_2, the third logical address LPN3 may be mapped to the second physical address PPN2_3, and the fourth logical address LPN4 may be mapped to the second physical address PPN2_4. In an embodiment, the second physical addresses PPN2_1, PPN2_2, PPN2_3, and PPN2_4 may be the same as one another and may indicate the first page. As shown in table 330, a combination of the first cell information mu1 and the second physical address PPN2_1 may represent the first physical address PPN1_1, a combination of the second cell information mu2 and the second physical address PPN2_2 may represent the first physical address PPN1_2, a combination of the third cell information mu3 and the second physical address PPN2_3 may represent the first physical address PPN1_3, and a combination of the fourth cell information mu4 and the second physical address PPN2_4 may represent the first physical address PPN1_4.

Figure 4:
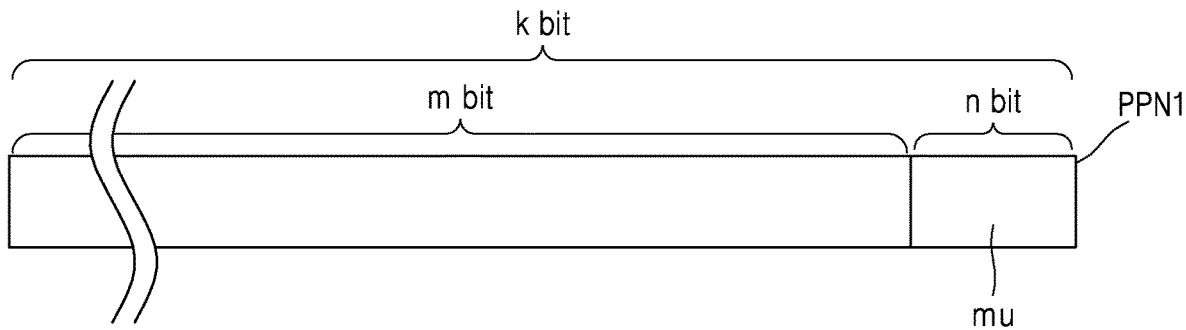
FIG. 4 is a diagram illustrating a physical address, according to an embodiment.
Figure 4:
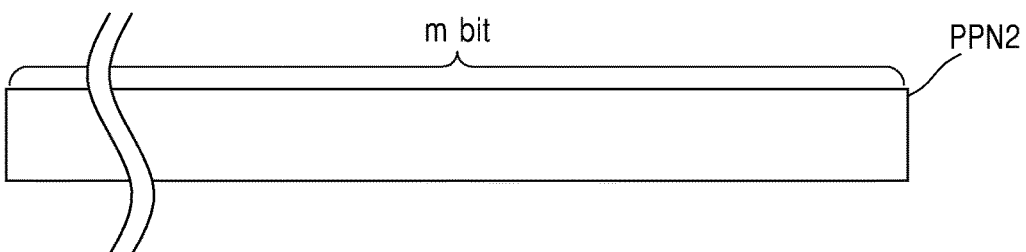

FIG. 4 is a diagram illustrating a physical address, according to an embodiment. The first physical address PPN1 of FIG. 4 may include and/or may be similar in many respects to at least one of the first physical addresses PPN1_1 to PPN1_4 of FIG. 3, and may include additional features not mentioned above. Furthermore, the second physical address PPN2 of FIG. 4 may include and/or may be similar in many respects to at least one of the second physical addresses PPN2_1 to PPN2_5 of FIG. 3, and may include additional features not mentioned above. In addition, the cell information mu of FIG. 4 may include and/or may be similar in many respects to at least one of the cell information mu1 to mu5 of FIG. 3, and may include additional features not mentioned above. Thus, a redundant description may be omitted for the sake of brevity.

Referring to FIG. 4, a first physical address PPN1 may be composed of k bits, where k is a positive integer greater than zero (0). The k bits may include upper m bits and lower n bits, where m and n are positive integers greater than zero (0). The upper m bits of the first physical address PPN1 may represent the address of a page of a memory block. The upper m bits of the first physical address PPN1 may include at least one of an address indicating a channel, an address indicating a bank, an address indicating a block, and an address indicating a page. The bank may refer to a group of a plurality of blocks and the channel may refer to a group of a plurality of banks. For example, the address indicating a channel may be composed of four (4) bits, the address indicating a bank may be composed of four (4) bits, the address indicating a block may be composed of twelve (12) bits, and the address indicating a page may be composed of nine (9) bits. However, the present disclosure is not limited in this regard, and the addresses may be composed of other numbers of bits, without departing from the scope of the present disclosure. In an embodiment, the address indicating a channel, the address indicating a bank, the address indicating a block, and the address indicating a page may be sequentially arranged in the upper m bits of the first physical address PPN1.

In an embodiment, the first physical address PPN1 may be obtained by adding the lower n bits to the upper m bits. In such an embodiment, the lower n bits of the first physical address PPN1 may represent the address of a cell in a memory page. The lower n bits corresponding to a part of the first physical address PPN1 may correspond to cell information mu. For example, n may be two (2) (e.g., n=2). However, the present disclosure is not limited thereto, and n may be equal to one (1) and/or may be equal to three (3) or more.

A second physical address PPN2 may be composed of m bits. In an embodiment, the second physical address PPN2 may be obtained by removing the lower n bits from the k bits of the first physical address PPN1. That is, the second physical address PPN2 may be obtained by removing the cell information mu from the first physical address PPN1. The second physical address PPN2 may represent an address of a page of a memory block. The second physical address PPN2 may include at least one of an address indicating a channel, an address indicating a bank, an address indicating a block, and an address indicating a page.

Because the second physical address PPN2 is stored in a volatile memory, the amount of data stored in the volatile memory may decrease compared to when the first physical address PPN1 is stored in the volatile memory. Consequently, the manufacturing cost of a memory system 10 may be reduced by decreasing the amount of mapping information stored in the volatile memory. For example, the first physical address PPN1 may be obtained by using mapping information stored in a non-volatile memory device.

Figure 5:
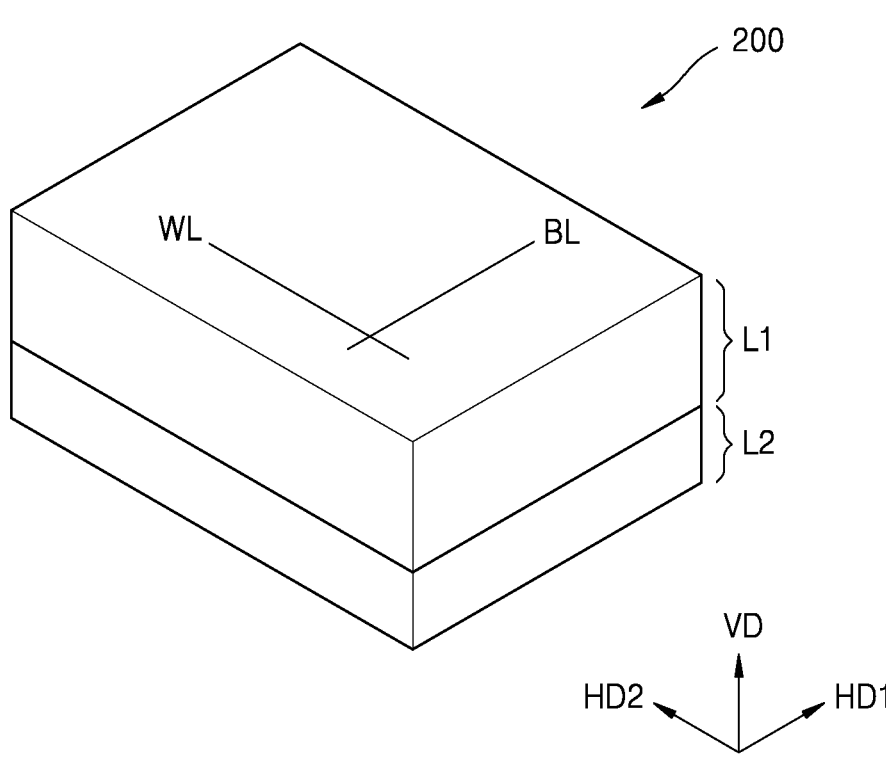
FIG. 5 is a schematic diagram illustrating the structure of a memory device in FIG. 1, according to an embodiment.
Figure 6:
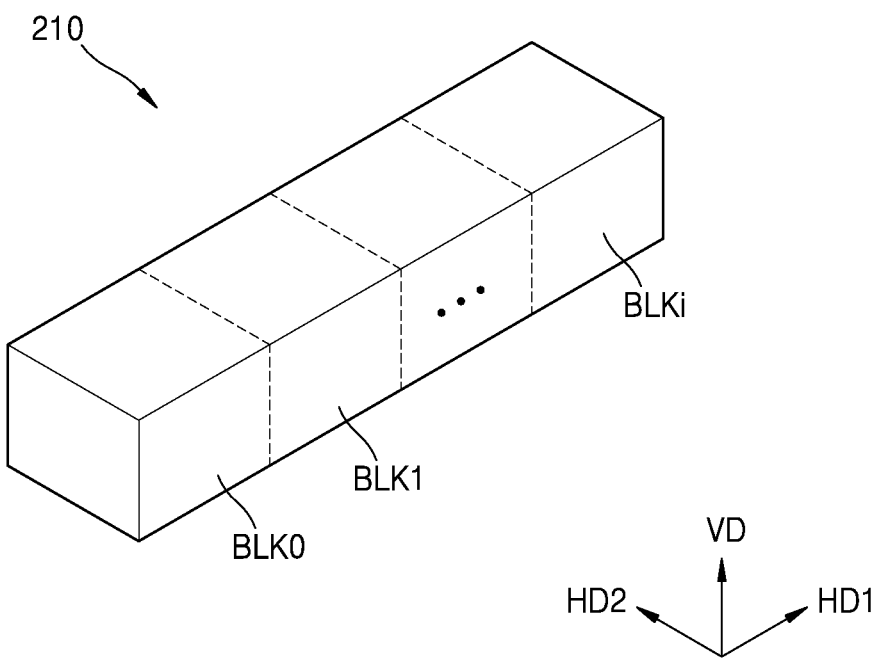
FIG. 6 is a diagram illustrating an example of a memory cell array in FIG. 1, according to an embodiment.
Figure 7:
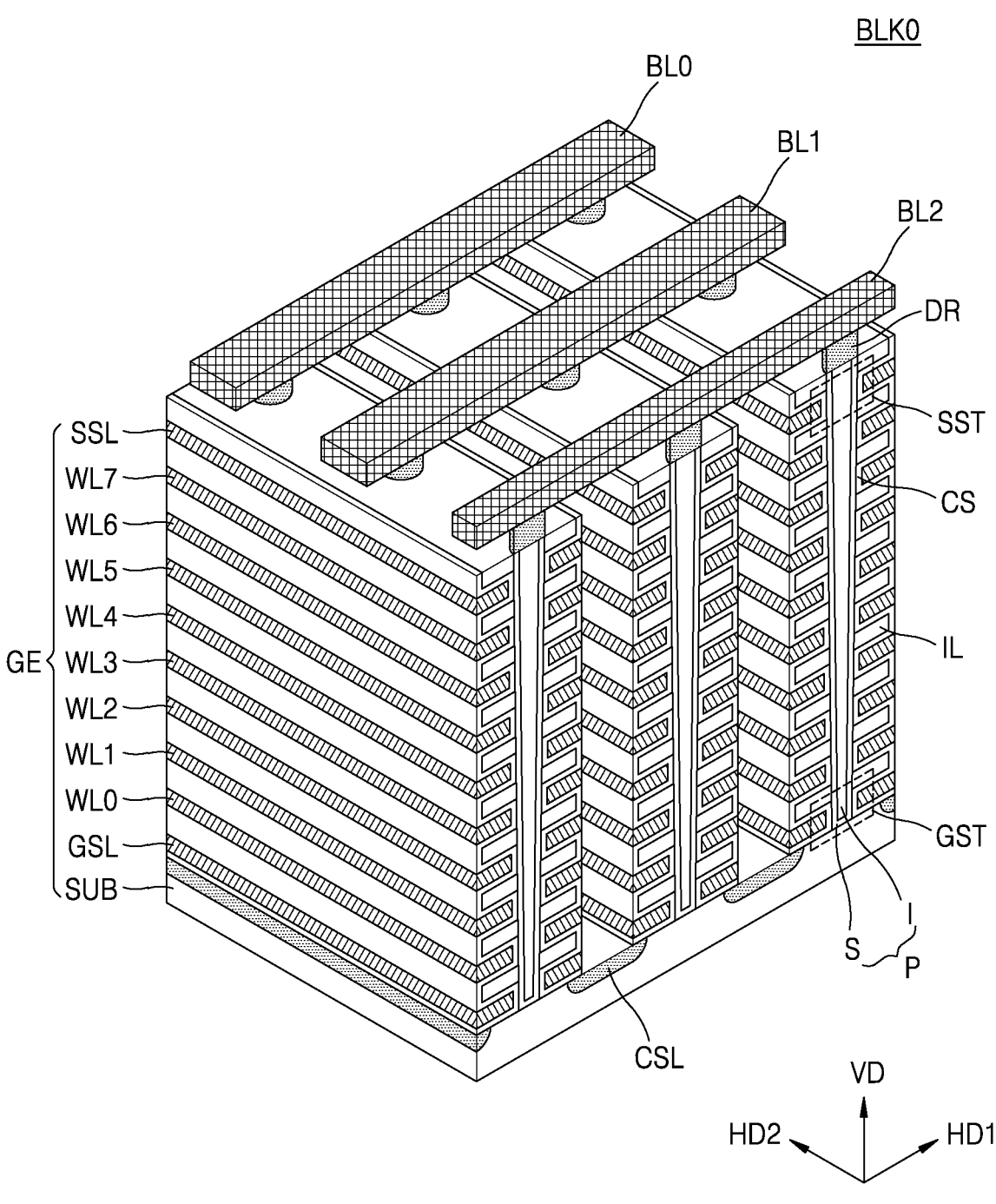
FIG. 7 is a perspective view of an example of the structure of a block in FIG. 6, according to an embodiment.

FIG. 5 is a schematic diagram illustrating the structure of the memory device in FIG. 1, according to an embodiment. FIG. 6 is a diagram illustrating an example of the memory cell array in FIG. 1, according to an embodiment. FIG. 7 is a perspective view of an example of the structure of a block in FIG. 6, according to an embodiment. Although the memory device 200 is illustrated as having a cell over periphery (COP) structure in FIG. 5, the present disclosure is not limited thereto. That is, the memory device 200 may have various structures without departing from the scope of the present disclosure.

Referring to FIG. 5, the memory device 200 may include a first semiconductor layer L1 and a second semiconductor layer L2. The first semiconductor layer L1 may be stacked on at least a portion of the second semiconductor layer L2 in a vertical direction VD. That is, the second semiconductor layer L2 may be below the first semiconductor layer L1 in the vertical direction VD, and thus, the second semiconductor layer L2 may be closer to a substrate than the first semiconductor layer L1.

In an embodiment, the memory cell array 210 in FIG. 1 may be formed in the first semiconductor layer L1 and peripheral circuits in FIG. 1 may be formed in the second semiconductor layer L2. For example, the logic circuit 220 may be formed in the second semiconductor layer L2. Accordingly, the memory device 200 may have a COP structure, in which the memory cell array 210 is above the peripheral circuits. In an embodiment, the COP structure may reduce a horizontal area (e.g., footprint) of the memory device 200 and may increase an integration density of the memory device 200.

In an embodiment, the second semiconductor layer L2 may include a substrate. The peripheral circuits may be formed in the second semiconductor layer L2 by forming transistors and/or metal patterns, which may interconnect the transistors, on the substrate. Subsequent to the peripheral circuits being formed in the second semiconductor layer L2, the first semiconductor layer L1, which may include the memory cell array 210, may be formed. For example, the metal patterns may be formed to electrically connect (e.g., couple) word lines WL and/or bit lines BL of the memory cell array 210 to the peripheral circuits in the second semiconductor layer L2. In an embodiment, the word lines WL may extend in a first horizontal direction HD1. Alternatively or additionally, the bit lines BL may extend in a second horizontal direction HD2.

Referring to FIG. 6, the memory cell array 210 may include a plurality of blocks (e.g., first block BLK0, second block BLK1, to i-th block BLKi, where i is a positive integer greater than zero (0), and hereinafter generally referred to as "BLK"). Each block of the plurality of blocks BLK may have a 3D structure (and/or a vertical structure). For example, each of the plurality of blocks BLK may include a plurality of NAND strings extending in the vertical direction VD. Alternatively or additionally, the NAND strings may be separated from each other by a certain distance in the first and second horizontal directions HD1 and HD2. In an embodiment, the plurality of blocks BLK may be selected by a row decoder of the memory device 200. For example, in such an embodiment, the row decoder may select a block corresponding to a block address from among the plurality of blocks BLK.

Referring to FIG. 7, the first block BLK0 may be formed in a direction that may be perpendicular to a substrate SUB. In an embodiment, the substrate SUB may have a first conductivity type (e.g., a p-type). A common source line CSL may extend on the substrate SUB in the second horizontal direction HD2 and may be doped with impurities of a second conductivity type (e.g., an n-type). On a region of the substrate SUB between two adjacent common source lines CSL, a plurality of insulating layers IL may extend in the second horizontal direction HD and may be sequentially provided in the vertical direction VD. The plurality of insulating layers IL may be separated from each other by a certain distance in the vertical direction VD. For example, the plurality of insulating layers IL may include an insulating material such as, but not limited to, silicon oxide (e.g., $SiO_2$).

On the region of the substrate SUB between two adjacent common source lines CSL, a plurality of pillars P may pass through the plurality of insulating layers IL in the vertical direction VD. The plurality of pillars P may be arranged in the first horizontal direction HD1. For example, the plurality of pillars P may pass through the plurality of insulating layers IL to be in contact with the substrate SUB. In an embodiment, a surface layer S of each pillar P may include a silicone material of the first conductivity type and may function as a channel region. Alternatively or additionally, an inner layer I of each pillar P may include an insulating material, such as, but not limited to, silicon oxide (e.g., $SiO_2$) and an air gap.

In the region between two adjacent common source lines CSL, a charge storage layer CS may be provided along the exposed surfaces of the plurality of insulating layers IL, the plurality of pillars P, and the substrate SUB. The charge storage layer CS may include a gate insulating layer (or tunneling insulating layer), a charge trap layer, and a blocking insulating layer. For example, the charge storage layer CS may have an oxide-nitride-oxide (ONO) structure. In the region between two adjacent common source lines CSL, gate electrodes GE, such as selection lines GSL and SSL and word lines WL0 to WL7, may be provided on an exposed surface of the charge storage layer CS.

Drains and/or drain contacts DR may be respectively provided on the plurality of pillars P. For example, the drains and/or drain contacts DR may include, but not be limited to, a silicone material doped with impurities of the second conductivity type (e.g., an n-type). Bit lines BL1 to BL3 may extend on the drains and/or drain contacts DR in the first horizontal direction HD1. Alternatively or additionally, the bit lines BL1 to BL3 may be separated from each other by a certain distance in the second horizontal direction HD2.

Figure 8:
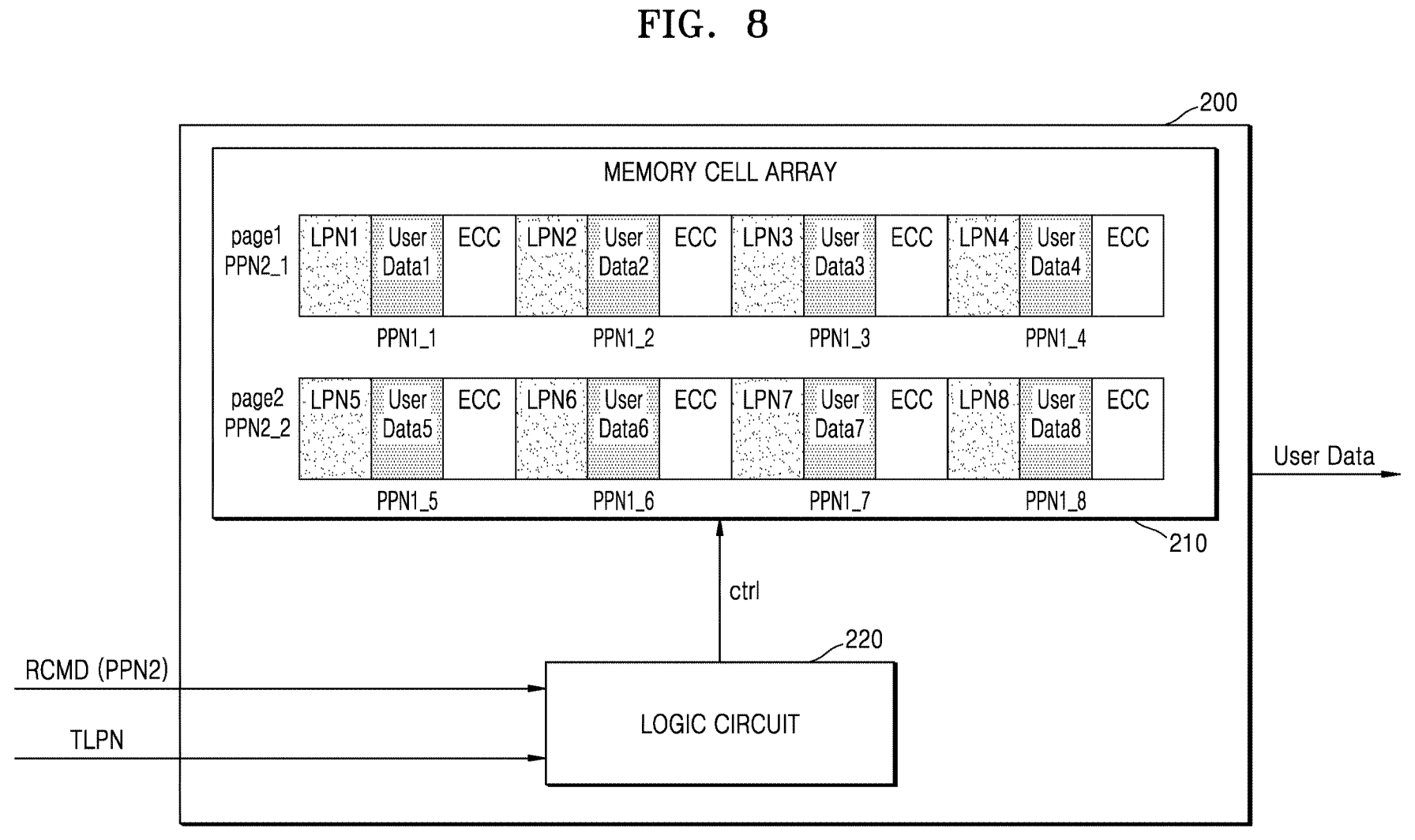

FIG. 8 is a diagram illustrating the operation of the logic circuit, according to an embodiment. The memory device 200, the memory cell array 210, and the logic circuit 220 of FIG. 8 may include and/or may be similar in many respects to the memory device 200, the memory cell array 210, and the logic circuit 220 of FIG. 1, respectively, and may include additional features not mentioned above. Thus, a redundant description may be omitted for the sake of brevity.

Referring to FIG. 8, the memory cell array 210 may include a first page page1 and a second page page2. Each of the first page page1 and the second page page2 may include first mapping information, user data, and an ECC. In an embodiment, each of the first page page1 and the second page page2 may include four (4) cells. For example, first page page1 may include cells respectively corresponding to first physical addresses PPN1_1, PPN1_2, PPN1_3, and PPN1_4. However, the present disclosure is not limited thereto, and each page may include less (e.g., three (3) or less) and/or more than four (4) cells (e.g., five (5) or more).

In an embodiment, the first page page1 may include first mapping information and user data. For example, the first page page1 may store the first mapping information corresponding to the user data stored in the first page page1. In such an example, the first page page1 may store first to fourth logical addresses LPN1 to LPN4 as the first mapping information. In an embodiment, the first logical address LPN1 may be mapped to cell information of the first physical address PPN1_1, the second logical address LPN2 may be mapped to cell information of the first physical address PPN1_2, the third logical address LPN3 may be mapped to cell information of the first physical address PPN1_3, and the fourth logical address LPN4 may be mapped to cell information of the first physical address PPN1_4. In an optional or additional embodiment, a second physical address PPN2_1 may indicate the first page page1.

In an embodiment, the second page page2 may include first mapping information and user data. For example, the second page page2 may store the first mapping information corresponding to the user data stored in the second page page2. In such an example, the second page page2 may include cells respectively corresponding to first physical addresses PPN1_5, PPN1_6, PPN1_7, and PPN1_8. The second page page2 may store fifth to eighth logical addresses LPN5, LPN6, LPN7, and LPN8 as the first mapping information. In an embodiment, the fifth logical address LPN5 may be mapped to cell information of the first physical address PPN1_5, the sixth logical address LPN6 may be mapped to cell information of the first physical address PPN1_6, the seventh logical address LPN7 may be mapped to cell information of the first physical address PPN1_7, and the eighth logical address LPN8 may be mapped to cell information of the first physical address PPN1_8. In an optional or additional embodiment, a second physical address PPN2_2 may indicate the second page page2. Although the memory cell array 210 is shown in FIG. 8 as including the first page page1 and the second page page2, the present disclosure is not limited in this regard. For example, the memory cell array 210 may include less (e.g., one (1)) and/or more than two (2) pages (e.g., three (3) or more).

In an embodiment, the logic circuit 220 may receive a read command RCMD and a target logical address TLPN. In response to the read command RCMD, the logic circuit 220 may obtain a target first physical address by using first mapping information (e.g., first mapping information MIF1 of FIG. 1, first mapping information MIF1 310 of FIG. 3). The logic circuit 220 may obtain the target first physical address by using the first mapping information and/or may obtain user data from a cell corresponding to the target first physical address.

In response to the read command RCMD including a target second physical address PPN2, the logic circuit 220 may search for a page indicated by the target second physical address PPN2. The logic circuit 220 may read user data from a cell corresponding to the target first physical address from among a plurality of cells included in the page indicated by the target second physical address PPN2. For example, the logic circuit 220 may generate a control signal ctrl for controlling the memory cell array 210 to read the user data from the cell corresponding to the first physical address from among the cells included in the page indicated by the target second physical address PPN2.

In an embodiment, the logic circuit 220 may obtain the target first physical address based on first mapping information stored in the page corresponding to the target second physical address PPN2 from among a plurality of pages. For example, when the target second physical address PPN2 is the second physical address PPN2_1, the logic circuit 220 may obtain the target first physical address based on the first to fourth logical addresses LPN1 to LPN4 corresponding to first mapping information included in the first page page1 and may read user data from a cell corresponding to the target first physical address. For another example, when the target second physical address PPN2 is the second physical address PPN2_2 the logic circuit 220 may obtain the target first physical address based on the fifth to eighth logical addresses LPN5 to LPN8 corresponding to first mapping information included in the second page page2 and may read user data from a cell corresponding to the target first physical address. Alternatively or additionally, the memory device 200 may provide the user data to a host.

In an embodiment, the logic circuit 220 may obtain the target first physical address based on the target logical address TLPN. The logic circuit 220 may compare the target logical address TLPN with a logical address stored in a page corresponding to the target second physical address PPN2. The logic circuit 220 may determine a first physical address, which may be mapped to a logical address that may be the same as the target logical address TLPN, to be the target first physical address. The logic circuit 220 may read user data from a cell corresponding to the target first physical address. The logic circuit 220 may obtain the target first physical address, based on the target second physical address PPN2 and cell information mapped to the logical address that may be the same as the target logical address TLPN.

In an embodiment, the target second physical address PPN2 may be the second physical address PPN2_1. In such an embodiment, the logic circuit 220 may compare the target logical address TLPN with the first to fourth logical addresses LPN1 to LPN4 stored in the first page page1. For example, when the target logical address TLPN is the first logical address LPN1, the target logical address TLPN may be the same as (e.g., match) the first logical address LPN1. Accordingly, the logic circuit 220 may determine the first physical address PPN1_1 to be the target first physical address, based on first cell information mapped to the first logical address LPN1 and the second physical address PPN2_1. In an optional or additional embodiment, the logic circuit 220 may read user data from a cell corresponding to the first physical address PPN1_1.

In an embodiment, the target second physical address PPN2 may be the second physical address PPN2_2. In such an embodiment, the logic circuit 220 may compare the target logical address TLPN with the fifth to eighth logical addresses LPN5 to LPN8 stored in the second page page2. For example, when the target logical address TLPN is the seventh logical address LPN7, the target logical address TLPN may be the same as (e.g., match) the seventh logical address LPN7. Accordingly, the logic circuit 220 may determine the first physical address PPN1_7 to be the target first physical address, based on seventh cell information mapped to the seventh logical address LPN7 and the second physical address PPN2_2. Consequently, the logic circuit 220 may read user data from a cell corresponding to the first physical address PPN1_7. For example, the logic circuit 220 may read user data 7 corresponding to the first physical address PPN1_7.

In an embodiment, the logic circuit 220 may receive a hint code. The hint code may indicate at least one of a logical address and a first physical address. In an embodiment, the hint code may be stored in the memory cell array 210. For example, the hint code may be stored in each page. For another example, the logic circuit 220 may receive a hint code that has been received, from a host, by a memory controller 100. However, the present disclosure is not limited thereto. For example, the logic circuit 220 may receive a hint code from various components of a memory system 10.

The logic circuit 220, according to an embodiment, may obtain a target first physical address based on a hint code. For example, the logic circuit 220 may compare the received hint code with a hint code stored in the memory cell array 210. Alternatively or additionally, the logic circuit 220 may obtain the target first physical address based on first mapping information represented by the hint code that may be the same as (e.g., match) the received hint code. For example, the matching hint code may represent the second logical address LPN2. Alternatively or additionally, the first physical address PPN1_2 may be the target first physical address.

In an optional or additional embodiment, a first physical address may be stored in a volatile memory, and the logic circuit 220 may read data from a cell corresponding to the first physical address in response to the read command RCMD including information on the first physical address. Because a volatile memory having a large capacity may be needed to store the first physical address, manufacturing cost may increase. According to the present embodiment, a memory system 10 may decrease the amount of mapping information stored in a volatile memory by storing a second physical address in the volatile memory, and the memory device 200 corresponding to a non-volatile memory may obtain a first physical address and find a physical location where user data is stored.

FIG. 9 is a diagram illustrating a page according to an embodiment. The memory device 200, the memory cell array 210, and the logic circuit 220 of FIG. 9 may include and/or may be similar in many respects to the memory device 200, the memory cell array 210, and the logic circuit 220 of FIG. 8, respectively, and may include additional features not mentioned above. Thus, a redundant description may be omitted for the sake of brevity.

Referring to FIG. 9, the memory cell array 210 may include the first page page1 and the second page page2. Each of the first page page1 and the second page page2 may include first mapping information, user data, and an ECC. For example, each of the first page page1 and the second page page2 may include four (4) cells. The first page page1 may include cells respectively corresponding to the first physical addresses PPN1_1, PPN1_2, PPN1_3, and PPN1_4.

In an embodiment, the first page page1 may store first mapping information corresponding to user data stored in the first page page1. The first page page1 may store the first to fourth logical addresses LPN1 to LPN4 as the first mapping information. In an embodiment, a plurality of pieces of first mapping information respectively corresponding to a plurality of cells may be consecutively arranged in a page including the cells. For example, the first to fourth logical addresses LPN1 to LPN4 included in the first page page1 may be consecutively arranged in the first page page1.

In an embodiment, a plurality of pieces of first mapping information respectively corresponding to a plurality of cells may be consecutively arranged at the beginning of a page including the cells. For example, the first to fourth logical addresses LPN1 to LPN4 may be sequentially arranged at the beginning of the first page page1 and stored in the order listed, as shown in FIG. 9. In an embodiment, user data and an ECC may be stored adjacent to the fourth logical address LPN4. Alternatively or additionally, the fifth to eighth logical addresses LPN5 to LPN8 may be sequentially arranged at the beginning of the second page page2 and stored in the order listed, as further shown in FIG. 9. In an embodiment, user data and an ECC may be stored adjacent to the eighth logical address LPN8. In an embodiment, when pieces of first mapping information are arranged at the beginning of each page, the rate of read errors occurring when the pieces of first mapping information are read from each page may be reduced.

The logic circuit 220, according to an embodiment, may obtain a target first physical address based on first mapping information stored in a page corresponding to the target second physical address PPN2 from among a plurality of pages. In an optional or additional embodiment, the logic circuit 220 may obtain the target first physical address based on the target logical address TLPN. The logic circuit 220 may compare the target logical address TLPN with a logical address stored in a page corresponding to the target second physical address PPN2. The logic circuit 220 may obtain the target first physical address by using a logical address that is the same as (e.g., matches) the target logical address TLPN. The logic circuit 220 may read user data from a cell corresponding to the target first physical address.

Figure 10:
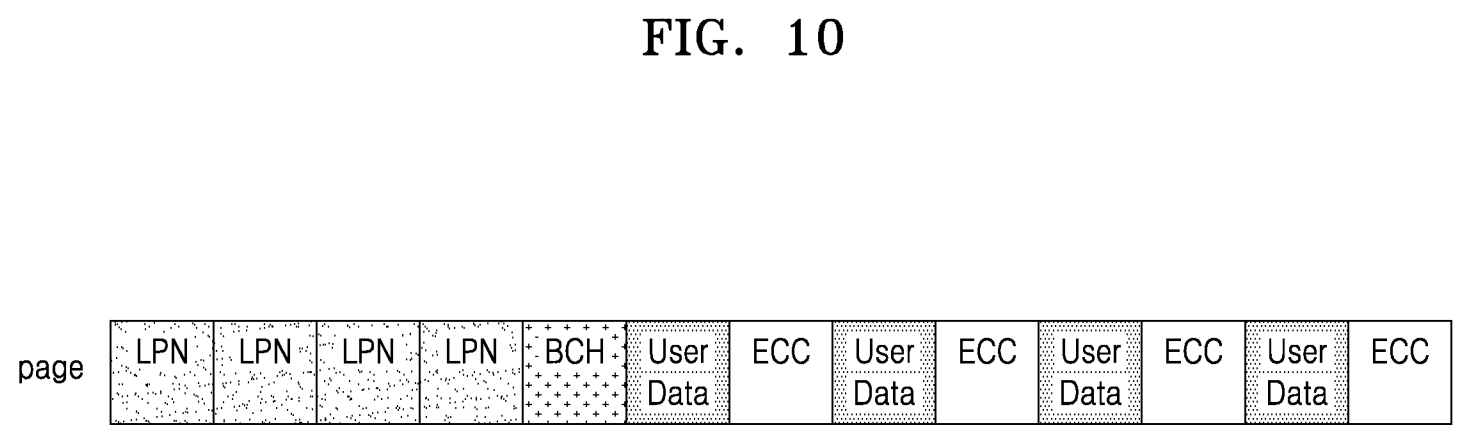

FIG. 10 is a diagram illustrating the structure of a page, according to an embodiment. The page of FIG. 10 may include and/or may be similar in many respects to at least one of page1 and page2 of FIGS. 8 and 9, and may include additional features not mentioned above. Thus, a redundant description may be omitted for the sake of brevity.

Referring to FIG. 10, the page may include first mapping information, user data, and an ECC. For example, the page may include four (4) cells. In an embodiment, pieces of first mapping information respectively corresponding to a plurality of cells may be consecutively arranged in a page including the cells. In the page, logical addresses mapped to first physical addresses respectively corresponding to the cells may be consecutively arranged.

In an embodiment, each page may store an error correction code BCH. The error correction code BCH may refer to a code for correcting an error in first mapping information stored in each page. For example, the error correction code BCH may be and/or include a Bose-Chaudhuri-Hoc-quenghem (BCH) code. The error correction code BCH may be stored behind the consecutive logical addresses LPN. That is, the error correction code BCH may be arranged following the consecutive logical addresses. When the error correction code BCH is stored behind the first mapping information in the page, a logical address having an error from among the consecutive logical addresses may be detected and/or corrected.

Figure 11:
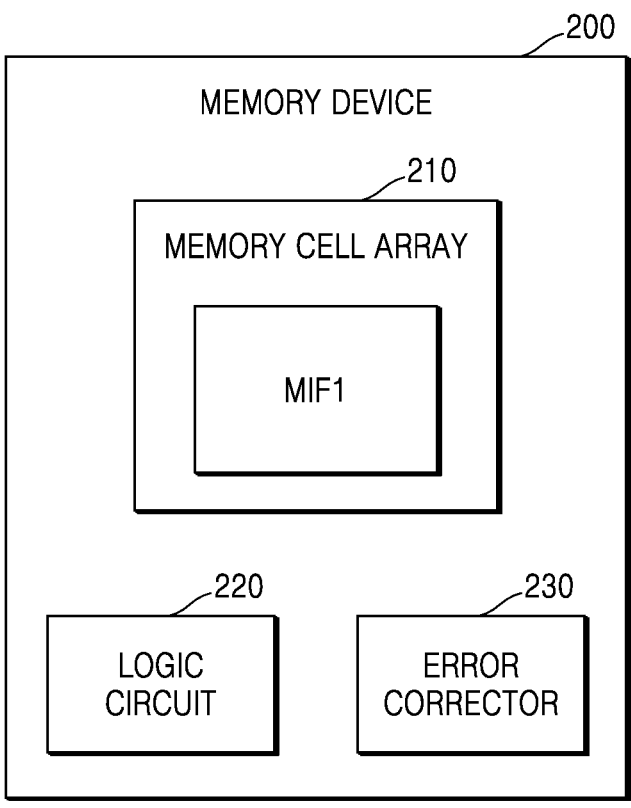
FIG. 11 is a block diagram illustrating a memory device, according to an embodiment.

FIG. 11 is a block diagram illustrating the memory device, according to an embodiment. The memory device 200 of FIG. 11 may include and/or may be similar in many respects to the memory device 200 described with reference to FIGS. 1 to 10, and may include additional features not mentioned above. Thus, a redundant description may be omitted for the sake of brevity.

Referring to FIG. 11, the memory device 200 may include the memory cell array 210 and the logic circuit 220. The memory cell array 210 may include a plurality of pages. Each page of the plurality of pages may include the first mapping information MIF1, user data, and an error correction code.

The memory device 200 may further include an error corrector 230. The error corrector 230 may detect a logical address having an error among logical addresses stored in each page and/or may correct the error. For example, the error corrector 230 may detect a logical address having an error and correct the error, based on an error correction code stored in each page. The error corrector 230 may read consecutive logical addresses and an error correction code and detect a logical address having an error among the consecutive logical addresses. For example, first to fourth logical addresses (e.g., LPN of FIG. 10) and a first error correction code (e.g., BCH of FIG. 10) may be stored in a first page. The error corrector 230 may detect a logical address having an error among the first to fourth logical addresses and correct the error, based on the first error correction code BCH.

The error corrector 230 may perform error correction by using a BCH error correction algorithm. The BCH error correction algorithm may correct multiple bit errors in a data block. For example, the BCH error correction algorithm may decode an error correction code by using an error correction decoder. In an embodiment, the decoding of the error correction code may include, but not be limited to, calculating a syndrome, constructing an error location polynomial by using the syndrome, and calculating the locations of error bits by obtaining the root of the error location polynomial. For example, when decoding a binary error correction code, an error may be corrected by inverting a bit value of an error bit. The error corrector 230 may include components for performing error correction on a logical address. For example, the error corrector 230 may include, but not be limited to, an error correction decoder and the like. That is, the present disclosure is not limited thereto.

FIG. 12 is a diagram illustrating the memory device, according to an embodiment. The memory device 300 of FIG. 12 may include and/or may be similar in many respects to the memory device 200 described with reference to FIGS. 1 to 11, and may include additional features not mentioned above. Thus, a redundant description may be omitted for the sake of brevity.

Referring to FIG. 12, the memory device 300 may include the memory cell array 210, the logic circuit 220, and a latch 240. Although the memory device 300 as shown in FIG. 12 includes one latch 240 for ease of description, the present disclosure is not limited thereto. For example, the memory device 300 may include two (2) or more latches 240. The latch 240 may output data Data sensed from the memory cell array 210. In an embodiment, in response to the read command RCMD, the memory device 300 may sense user data from a cell corresponding to a target first physical address in the memory cell array 210, and the user data may be transmitted from the memory cell array 210 to the latch 240 and output from the latch 240 as data Data.

When the memory device 300 receives the read command RCMD, data stored in the memory cell array 210 may be transmitted to the latch 240. For example, in response to the read command RCMD including information on the target second physical address PPN2, the logic circuit 220 may obtain the target first physical address, and/or the user data stored in the cell corresponding to the target first physical address may be transmitted to the latch 240 as data. The logic circuit 220 may control the latch 240 by providing a latch control signal ctrl_lat to the latch 240 in response to a command. For example, when the target logical address TLPN is the second logical address LPN2, the logic circuit 220 may obtain the first physical address PPN1_2 in response to the read command RCMD, and/or user data stored in a cell corresponding to the first physical address PPN1_2 may be transmitted to the latch 240. The data transmitted to the latch 240 may be output to a memory controller (e.g., the memory controller 100 in FIG. 1).

In an embodiment, a transfer operation, in which user data stored in a cell corresponding to a target first physical address may be sensed and transmitted to the latch 240 as data, and an output operation, in which the data may be transmitted to the latch 240 as output, may be controlled by a single command. For example, the transfer operation and the output operation may be controlled by the read command RCMD. In an optional or additional embodiment, the transfer operation and the output operation may be controlled by at least two commands. For example, the transfer operation may be controlled by a tR command, and the output operation may be controlled by a direct memory access (DMA) command.

Figure 13:
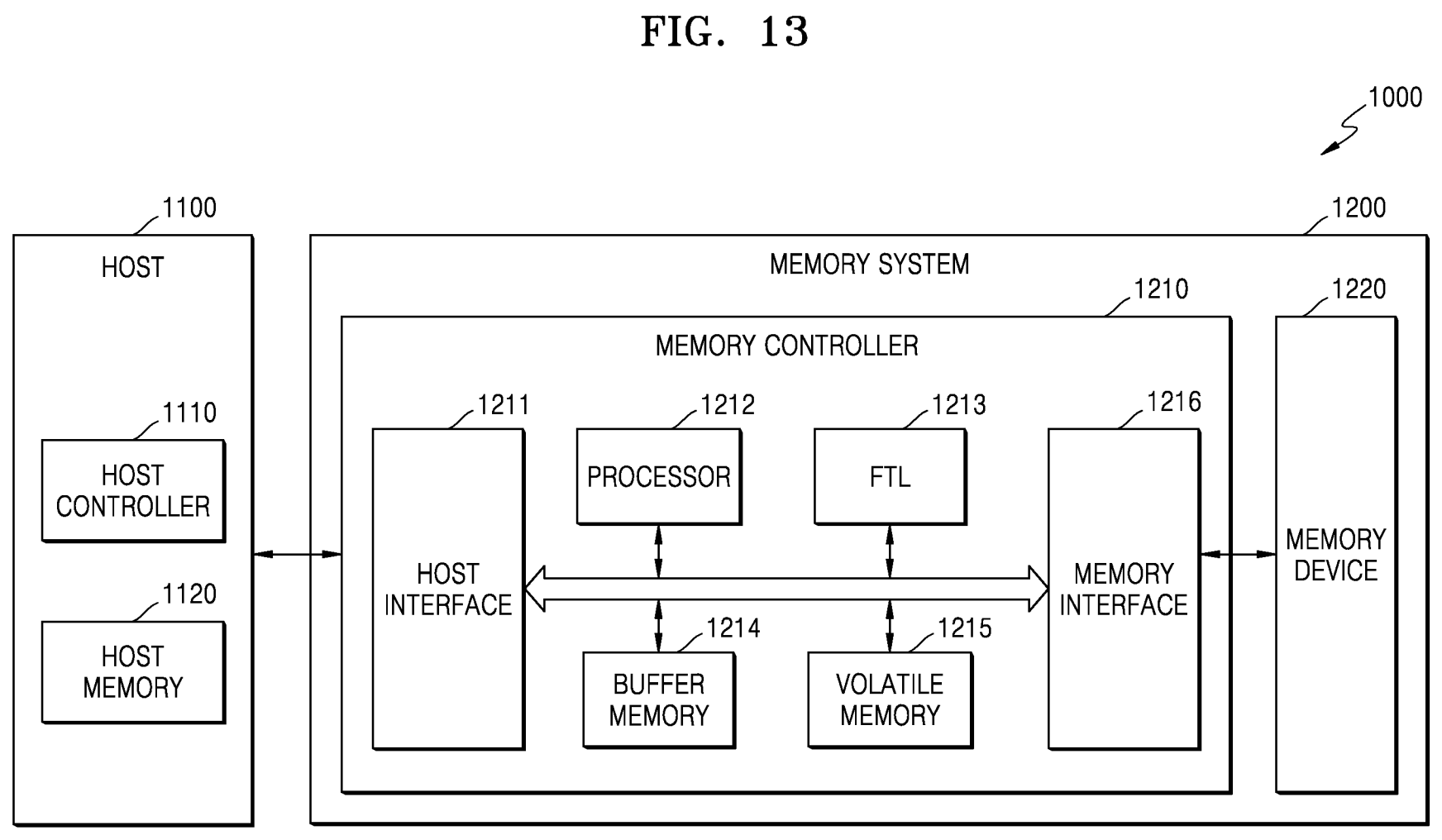

FIG. 13 is a block diagram of a host-memory system, according to an embodiment.

Referring to FIG. 13, a host-memory system 1000 may include a host 1100 and a memory system 1200. The memory system 1200 may include a memory controller 1210 and a memory device 1220. The memory system 1200, the memory controller 1210, and the memory device 1220 of FIG. 13 may include and/or may be similar in many respects to the memory system 10, the memory controller 100, and the memory device 200 of FIG. 1, respectively, and may include additional features not mentioned above.

As shown in FIG. 13, the host 1100 may include a host controller 1110 and a host memory 1120. In an embodiment, the host memory 1120 may function as a buffer memory to temporarily store data to be transmitted to the memory system 1200 and/or data transmitted from the memory system 1200.

According to an embodiment, the host controller 1110 and the host memory 1120 may be implemented in separate semiconductor chips from each other. In some embodiments, the host controller 1110 and the host memory 1120 may be integrated into one semiconductor chip. For example, the host controller 1110 may correspond to one of a plurality of modules of an application processor (AP). Alternatively or additionally, the application processor may be implemented as a system-on-chip (SoC). The host memory 1120 may include an embedded memory of the application processor, a non-volatile memory, and/or memory module outside the application processor.

In an embodiment, host controller 1110 may manage an operation of storing data (e.g., write data) of the host memory 1120 in the memory device 1220 and/or an operation of storing data (e.g., read data) of the memory device 1220 in the host memory 1120.

The memory controller 1210 may include a host interface 1211, a memory interface 1216, and a processor 1212. The memory controller 1210 may further include a flash translation layer (FTL) 1213, a buffer memory 1214, and a volatile memory 1215. In an embodiment, the memory controller 1210 may further include a working memory, to which the FTL 1213 may be loaded. When the processor 1212 executes the FTL 1213, data writing and reading operations of the memory device 1220 may be controlled.

The processor 1212 may generally control operations of the memory controller 1210 by executing firmware and/or programs loaded to the working memory and/or the FTL 1213. For example, when the memory controller 1210 controls a flash memory device, the FTL 1213 may be loaded to the working memory. That is, when the processor 1212 executes the FTL 1213, various functions related to a flash memory operation may be performed.

The host interface 1211 may exchange packets with the host 1100. A packet transmitted from the host 1100 to the host interface 1211 may include a command and/or data to be written to the memory device 1220. Alternatively or additionally, a packet transmitted from the host interface 1211 to the host 1100 may include a response to the command and/or data read from the memory device 1220. The memory interface 1216 may transmit, to the memory device 1220, data to be written to the memory device 1220 and/or receive data read from the memory device 1220. The memory interface 1216 may be implemented to comply with one or more memory storage standards, such as, but not limited to, Toggle and/or open NAND flash interface (ONFI).

The FTL 1213 may perform various functions, such as, but not limited to, address mapping, wear-leveling, and garbage collection. In an embodiment, the FTL 1213 may perform an address mapping operation in which a logical address received from the host 1100 may be mapped to a second physical address. For example, the FTL 1213 may perform the address mapping operation based on second mapping information (e.g., second mapping information MIF2 320 of FIG. 3). Wear-leveling may refer to a technology for preventing excessive degradation of a block by allowing blocks of the memory device 1220 to be uniformly used. In an embodiment, the wear-leveling may be implemented as a firmware technique for balancing the erase counts of physical blocks. Garbage collection may refer to technology for securing the available capacity of the memory device 1220 by copying valid data of an old block to a new block and erasing the old block.

The buffer memory 1214 may temporarily store data to be written to the memory device 1220 and/or data read from the memory device 1220. The buffer memory 1214 may be disposed inside and/or outside the memory controller 1210.

The volatile memory 1215 may store second mapping information. The second mapping information may refer to mapping information between a second physical address and a logical address. The volatile memory 1215 may be and/or may include, but not be limited to, a DRAM, an SRAM, and/or the like. In an embodiment, the volatile memory 1215 may be disposed inside the memory controller 1210. Alternatively or additionally, the the volatile memory 1215 may be disposed outside the memory controller 1210.

The memory device 1220 may include a non-volatile memory. For example, the memory device 1220 may include, but not be limited to, a NAND flash memory. In an embodiment, the memory device 1220 may store first mapping information. The first mapping information may refer to mapping information between a logical address and cell information corresponding to a part of a first physical address.

Figure 14:
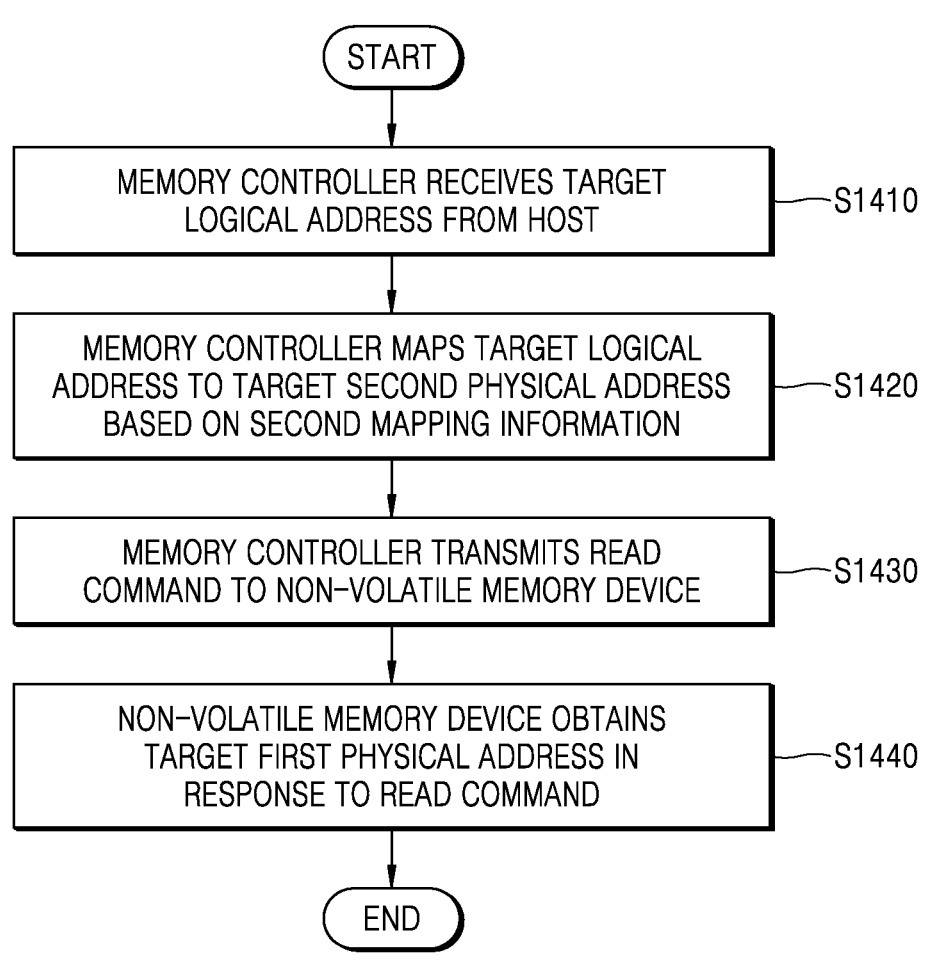
FIG. 14 is a flowchart of an operating method of a memory system, according to an embodiment.

FIG. 14 is a flowchart of an operating method of a memory system, according to an embodiment. Referring to FIG. 14, an operating method of the memory system 10 of FIG. 1 is illustrated. The memory system 10 may include a memory controller 100 and a memory device 200.

The memory controller 100 may receive a target logical address from a host in operation S1410. The target logical address may refer to a logical address that is a target of a memory operation.

The memory controller 100 may map the target logical address to a target second physical address based on second mapping information in operation S1420. The second mapping information may refer to mapping information between a logical address and a second physical address and may be stored in a volatile memory. In an embodiment, the memory controller 100 may include a volatile memory, and the second mapping information may be stored in the memory controller 100.

A second physical address may be a part of a first physical address. In an embodiment, the second physical address may have fewer bits than the first physical address. The first physical address may indicate a physical location where user data may be stored in a memory cell array. Cell information that may be part of the first physical address may represent information on a cell in which the user data may be stored. First mapping information that may refer to mapping information between cell information and a logical address may be stored in the memory device 200. The first mapping information may be stored in each page and include a logical address of the page, in which the first mapping information may be stored, and cell information regarding a first physical address.

The second physical address may be the remaining part of the first physical address excluding the cell information. The second physical address may be a remainder of the first physical address excluding the cell information. When the second physical address may be a part of the first physical address, the second physical address may approximately indicate a location where the user data may be stored in the memory device 200. For example, the second physical address may indicate a page in which the user data may be stored, and the first physical address may indicate a cell in which the user data may be stored. The second physical address and the cell information corresponding to the second physical address may represent the first physical address.

The memory controller 100 may receive, from the host, the target logical address that may be a target of a memory operation. The memory controller 100 may obtain a target second physical address mapped to the target logical address, based on the second mapping information. Based on the target second physical address, the memory controller 100 may generate a read command for controlling the memory operation of the memory device 200. The memory device 200 may be and/or may include, but not be limited to, a non-volatile memory device.

The memory controller 100 may transmit the read command to the non-volatile memory device in operation S1430. The read command may control the non-volatile memory device to read data from a physical address corresponding to the target logical address. The read command may include information on the target second physical address.

The non-volatile memory device may obtain a target first physical address in response to the read command in operation S1440. The non-volatile memory device may receive the read command from the memory controller 100. Upon receiving the read command, the non-volatile memory device may search for a location where data corresponding to the target second physical address may be stored. The non-volatile memory device may obtain the target first physical address mapped to the target logical address by using the first mapping information. The non-volatile memory device may read the user data from the physical location corresponding to the target first physical address in the memory cell array.

In an embodiment, the non-volatile memory device may receive a read command and a target logical address. The memory controller 100 may transmit the target logical address and the read command to the non-volatile memory device. The non-volatile memory device may obtain a target first physical address based on the target logical address and first mapping information. For example, the non-volatile memory device may obtain logical addresses, which may be stored in a page corresponding to a target second physical address, in response to the read command. The non-volatile memory device may compare the target logical address with the logical addresses stored in the page corresponding to the target second physical address. The non-volatile memory device may obtain the target first physical address by using the target second physical address and the logical address that is the same as the target logical address. The non-volatile memory device may read user data from a cell corresponding to the target first physical address.

Figure 15:
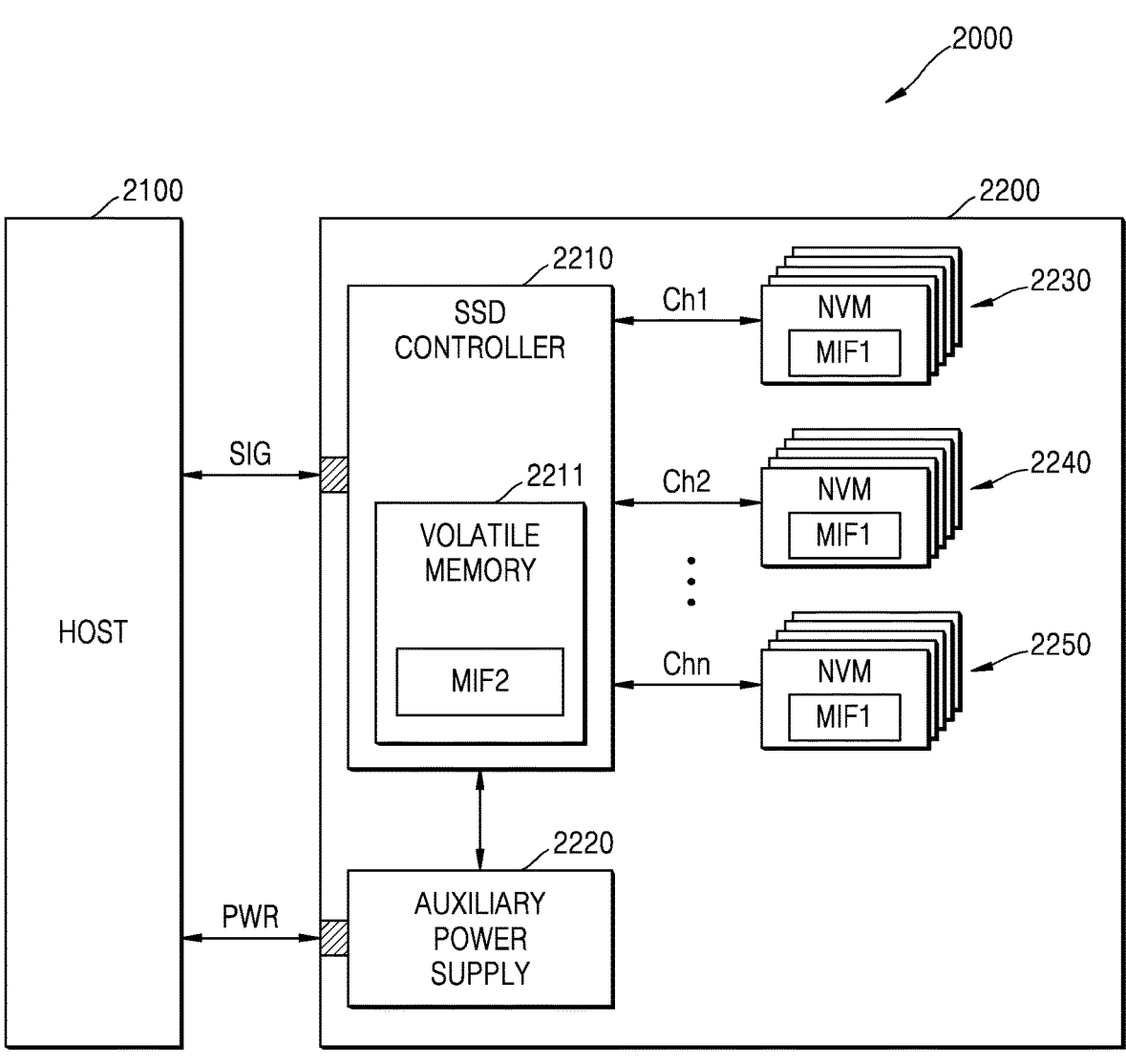
FIG. 15 is a block diagram illustrating an example of a solid-state drive (SSD) system using a memory device, according to an embodiment.

FIG. 15 is a block diagram illustrating an example of an SSD system using a memory device, according to embodiments.

Referring to FIG. 15, an SSD system 2000 may include a host 2100 and an SSD 2200. The SSD 2200 may exchange signals SIG with the host 2100 through a signal connector and may receive power PWR through a power connector. The SSD 2200 may include an SSD controller 2210, an auxiliary power supply 2220, non-volatile memory devices (e.g., first NVM 2230, second NVM 2240, and third NVM 2250), and a volatile memory 2211. The non-volatile memory devices 2230 to 2250 may include NAND flash memory. In an embodiment, the SSD 2200 may be implemented by using the embodiments described above with reference to FIGS. 1 to 14.

For example, the SSD controller 2210 of the SSD 2200 may include the volatile memory 2211 according to the embodiments described above. The volatile memory 2211 may store the second mapping information MIF2. The SSD controller 2210 may map a logical address received from the host 2100 to a second physical address and transmit a read command to the non-volatile memory devices 2230 to 2250. In response to the read command, the non-volatile memory devices 2230 to 2250 may obtain a first physical address mapped to the logical address. In an embodiment, various programs and/or data related to memory operation control may be stored in the volatile memory 2211 of the SSD controller 2210.

According to an embodiment, first mapping information MIF1 may be stored in the non-volatile memory devices 2230 to 2250. The first mapping information MFI1 may refer to mapping information between cell information of a first physical address and logical address. The non-volatile memory devices 2230 to 2250 may obtain the first physical address by using the logical address.

According to embodiments, a memory controller 100 may include various components. For example, the memory controller 100 may include the SSD controller 2210 and/or further including the auxiliary power supply 2220.

While the present disclosure has been particularly shown and described with reference to embodiments thereof, it may be understood that various changes in form and details may be made therein without departing from the spirit and scope of the following claims.

What is claimed is:

1. A memory system for communicating with a host, comprising:
   a non-volatile memory device storing first mapping information indicating a first relationship between a logical address and a portion of a first physical address, the first physical address indicating a location where user data is stored in a memory cell array;
   a volatile memory device storing second mapping information indicating a second relationship between the logical address and a second physical address, the second physical address corresponding to a remaining portion of the first physical address; and
   a memory controller configured to:
      obtain a target logical address that has been received from the host; and
      determine, based on the second mapping information, a target second physical address mapped to the target logical address,
   wherein the non-volatile memory device is configured to:
      receive, from the memory controller, a read command comprising the target second physical address and a hint code indicative of a target first physical address, the hint code being received from the host,
      determine the target first physical address by comparing the hint code with at least one first mapping information corresponding to the target second physical address,
      access an error correction code, stored in the non-volatile memory device, corresponding to the target logical address, using the target first physical address and the target second physical address,
      detect whether the target logical address comprises at least one error based on the error correction code, and
      correct the at least one error in the target logical address based on detection of the at least one error.

2. The memory system of claim 1, wherein:

the second physical address has been obtained by removing lower n bits from k bits of the first physical address, n is a positive integer greater than zero (0), and k is another positive integer greater than zero (0).

3. The memory system of claim 1, wherein:

the memory controller is further configured to transmit, to the non-volatile memory device, the target logical address, and the non-volatile memory device is further configured to obtain the target first physical address based on the target logical address and the first mapping information.

4. The memory system of claim 1, wherein:

the memory cell array comprises a plurality of pages, each of the plurality of pages comprises a plurality of cells storing the user data, and the first physical address corresponds to the plurality of cells.

5. The memory system of claim 4, wherein the non-volatile memory device is further configured to:

receive, from the memory controller, the read command and the target logical address, and obtain the target first physical address based on the first mapping information stored in a page from among the plurality of pages corresponding to the target second physical address.

6. The memory system of claim 5, wherein the non-volatile memory device is further configured to:

obtain the target first physical address by using the portion of the first physical address mapped to a matching logical address that matches the target logical address from among logical addresses stored in the page corresponding to the target second physical address from among the plurality of pages, and read the user data from a cell corresponding to the target first physical address.

7. The memory system of claim 4, wherein:

the non-volatile memory device comprises a latch configured to output data sensed from the memory cell array, and the non-volatile memory device is further configured to:

sense the user data from a cell corresponding to the target first physical address;

transmit the user data to the latch, based on the read command; and output the user data from the latch.

8. The memory system of claim 1, wherein:

the memory cell array comprises a plurality of pages, each of the plurality of pages comprises a plurality of cells, and pieces of first mapping information corresponding to the plurality of cells are consecutively arranged in each page of the plurality of pages.

9. The memory system of claim 8, wherein the pieces of first mapping information corresponding to the plurality of cells are consecutively arranged at a beginning of each page of the plurality of pages.

10. The memory system of claim 1, wherein:

the memory cell array comprises a plurality of pages, and each page of the plurality of pages is configured to store the error correction code.

11. A memory device, comprising:

a memory cell array comprising a plurality of pages storing mapping information indicating a relationship between logical addresses and first portions of physical addresses, each portion of the first portions of the physical addresses corresponding to a cell of a plurality of cells; and a logic circuit configured to:

receive a read command comprising information on a second portion of a target physical address corresponding a target logical address and a hint code indicative of a first portion of the target physical address, the hint code being received from a host, determine the first portion of the target physical address by comparing the hint code with at least one mapping information corresponding to the second portion of the target physical address, access an error correction code, stored in the memory cell array, corresponding to the target logical address, using the first portion of the target physical address and the second portion of the target physical address, detect whether the target logical address comprises at least one error based on the error correction code, and correct the at least one error in the target logical address based on detection of the at least one error.

12. The memory device of claim 11, wherein:

the target physical address has been obtained by adding lower n bits of the first portion of the target physical address to m bits of the second portion of the target physical address, n is a positive integer greater than zero (0), and m is another positive integer greater than zero (0).

13. The memory device of claim 11, wherein the logic circuit is further configured to:

receive the target logical address;

obtain the first portion of the target physical address based on the target logical address; and read user data from a corresponding cell of the plurality of cells, which corresponds to the first portion of the target physical address.

14. The memory device of claim 13, wherein the logic circuit is further configured to:

obtain one or more logical addresses stored in a page corresponding to the second portion of the target physical address, based on the read command; and compare the target logical address with the one or more logical addresses stored in the page corresponding to the second portion of the target physical address.

15. The memory device of claim 14, wherein the logic circuit is further configured to:

obtain the target physical address by using the first portion of the target physical address, the second portion of the target physical address being mapped to a matching logical address that matches the target logical address from among the logical addresses stored in the page corresponding to the second portion of the target physical address.

16. The memory device of claim 11, wherein pieces of mapping information corresponding to the plurality of cells of each page are consecutively arranged at a beginning of each page.

17. An operating method of a memory system, the operating method comprising:

receiving, by a memory controller of the memory system, a target logical address from a host, the target logical address being a target of a memory operation;

mapping, by the memory controller, the target logical address to a target second physical address, based on second mapping information indicating a second relationship between a logical address and a second physical address corresponding to a remaining portion of a first physical address, the second mapping information being stored in a volatile memory of the memory controller;

transmitting, by the memory controller, a read command to a non-volatile memory device of the memory system, the read command comprising information on the target second physical address and a hint code indicative of a target first physical address, the hint code being received from the host; and obtaining, by the non-volatile memory device, the target first physical address by using first mapping information indicating a first relationship between the logical address and a portion of the first physical address, based on the read command, the portion of the first physical address corresponding to each of a plurality of cells included in each of a plurality of pages, wherein the obtaining of the target first physical address comprises:

determining the target first physical address by comparing the hint code with at least one first mapping information corresponding to the target second physical address;

accessing, using the target first physical address and the target second physical address, an error correction code, stored in the non-volatile memory device, corresponding to the target logical address;

detecting whether the target logical address comprises at least one error based on the error correction code; and correcting the at least one error in the target logical address based on the detecting of the at least one error.

18. The operating method of claim 17, wherein the transmitting of the read command comprises transmitting, by the memory controller, the target logical address to the non-volatile memory device.

19. The operating method of claim 18, wherein the obtaining of the target first physical address comprises:

obtaining logical addresses stored in a page corresponding to the target second physical address, based on the read command; and comparing the target logical address with the logical addresses stored in the page corresponding to the target second physical address.

20. The operating method of claim 17, wherein a second number of bits of the second physical address is smaller than a first number of bits of the first physical address.

* * * * *